(12) United States Patent
Kashima

(10) Patent No.: US 7,359,018 B2
(45) Date of Patent: Apr. 15, 2008

(54) RETARDATION OPTICAL ELEMENT, PROCESS OF PRODUCING THE SAME, AND LIQUID CRYSTAL DISPLAY

(75) Inventor: Keiji Kashima, Shinjuku-Ku (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 117 days.

(21) Appl. No.: 10/499,906

(22) PCT Filed: Aug. 25, 2003

(86) PCT No.: PCT/JP03/10704

§ 371 (c)(1),
(2), (4) Date: Jun. 22, 2004

(87) PCT Pub. No.: WO2004/019085

PCT Pub. Date: Mar. 4, 2004

(65) Prior Publication Data

US 2005/0213023 A1 Sep. 29, 2005

(30) Foreign Application Priority Data

Aug. 26, 2002 (JP) .............................. 2002-245675

(51) Int. Cl.
*G02F 1/1335* (2006.01)

(52) U.S. Cl. ...................... 349/119; 349/117; 349/118; 349/120

(58) Field of Classification Search ......... 349/117–120
See application file for complete search history.

(56) References Cited

U.S. PATENT DOCUMENTS 6,903,789 B1 * 6/2005 Cutler et al. ................ 349/119

FOREIGN PATENT DOCUMENTS

| JP | 57-165480 | 10/1982 |
|----|-----------|---------|
| JP | 3-067219 | 3/1991 |
| JP | 04-322223 | 11/1992 |
| JP | 07-258638 | 10/1995 |
| JP | 09-133810 | 5/1997 |

OTHER PUBLICATIONS

Machine-Translated copy of JP 2002-189124.*

*Primary Examiner*—Andrew Schechter
*Assistant Examiner*—W. Patty Chen
(74) *Attorney, Agent, or Firm*—Oliff & Berridge, PLC

(57) ABSTRACT

The present invention provides a retardation optical element comprising a negative C plate (retardation layer) and an A plate (retardation layer), never causing the appearance of bright-and-dark patterns on the displayed image even when placed between a liquid crystal cell and a polarizer, thus being capable of effectively preventing lowering of display quality. A retardation optical element 10 comprises: a C plate type retardation layer 12 that has a cholesteric structure with liquid crystalline molecules in planar orientation and functions as a negative C plate; and an A plate type retardation layer 14 that has a nematic structure and functions as an A plate. The C plate type retardation layer 12 and the A plate type retardation layer 14 are laminated adjacently to each other, and the directions of the directors Cb of liquid crystalline molecules on the surface 12B, on the A plate type retardation layer 14 side, of the C plate type retardation layer 12 are substantially the same as the directions of the directors Na of liquid crystalline molecules on the surface 14A, on the C plate type retardation layer 12 side, of the A plate type retardation layer 14. Further, the C plate type retardation layer 12 is made to have a helical structure with a helical pitch so adjusted that the C plate type retardation layer 12 selectively reflects, owing to its structure, light whose wavelength falls in a wave range that is different from the wave range of incident light.

21 Claims, 7 Drawing Sheets

FOREIGN PATENT DOCUMENTS

| | | |
|---|---|---|
| JP | 10-508882 | 9/1998 |
| JP | 11-242225 | 9/1999 |
| JP | 11-258605 | 9/1999 |
| JP | 11-258606 | 9/1999 |
| JP | 11-293252 | 10/1999 |
| JP | 2000-227520 | 8/2000 |
| JP | 2001-083523 | 3/2001 |
| JP | 2001-100211 | 4/2001 |
| JP | 2001-108823 | 4/2001 |
| JP | 2001-249225 | 9/2001 |
| JP | 2002-189124 | 7/2002 |
| JP | 2002189124 A * | 7/2002 |
| JP | 2002-258053 | 9/2002 |
| JP | A-2002-258053 | 9/2002 |
| JP | 2002-296424 | 10/2002 |
| JP | 2002-365636 | 12/2002 |
| JP | 2003-015134 | 1/2003 |
| KR | 10-0265054 B1 | 6/2000 |

* cited by examiner

RETARDATION OPTICAL ELEMENT, PROCESS OF PRODUCING THE SAME, AND LIQUID CRYSTAL DISPLAY

FIELD OF THE INVENTION

The present invention relates to a retardation optical element for use in a liquid crystal display or the like, especially a retardation optical element that comprises a retardation layer functioning as a negative C plate and a retardation layer functioning as an A plate. By using this retardation optical element, of the light incident on and/or emerging from a liquid crystal cell, the light emerging slantingly from the liquid crystal cell in the direction deviating from the normal to the liquid crystal cell is compensated for the state of polarization. The present invention also relates to a process of producing the retardation optical element, and to a liquid crystal display comprising the retardation optical element.

BACKGROUND ART

FIG. 9 is a diagrammatic, exploded perspective view of a conventional, standard liquid crystal display.

As shown in FIG. 9, the conventional liquid crystal display 100 comprises a polarizer 102A on the incident side, a polarizer 102B on the emergent side, and a liquid crystal cell 104.

Of these components, the polarizers 102A and 102B are so made that they selectively transmit only linearly polarized light having the plane of vibration in a predetermined direction, and are arranged in the cross nicol disposition so that the direction of vibration of the linearly polarized light transmitted by the polarizer 102A is perpendicular to that of vibration of the linearly polarized light transmitted by the polarizer 102B. The liquid crystal cell 104 comprises a large number of cells corresponding to pixels, and is placed between the polarizers 102A and 102B.

The case where the liquid crystal cell 104 in the above-described liquid crystal display 100 is of VA (Vertical Alignment) mode, in which a nematic liquid crystal having negative dielectric anisotropy is sealed in a liquid crystal cell, is now taken as an example (in the figure, a dotted line diagrammatically indicates the direction of the director of the liquid crystal). Linearly polarized light that has passed through the polarizer 102A on the incident side passes, without undergoing phase shift, through those cells in the liquid crystal cell 104 that are in the non-driven state, and is blocked by the polarizer 102B on the emergent side. On the contrary, the linearly polarized light undergoes phase shift while it passes through those cells in the liquid crystal cell 104 that are in the driven state, and the light in an amount corresponding to the amount of this phase shift passes through and emerges from the polarizer 102B on the emergent side. It is therefore possible to display the desired image on the emergent-side polarizer 102B side by properly, individually controlling the driving voltage that is applied to each cell in the liquid crystal cell 104. The liquid crystal display 100 is not limited to the above embodiment in which light is transmitted and blocked in the above-described manner, and there is also a liquid crystal display so constructed that light emerging from those cells in the liquid crystal cell 104 that are in the non-driven state passes through and emerges from the polarizer 102B on the emergent side, but that light emerging from those cells that are in the driven state is blocked by the polarizer 102B on the emergent side.

Consideration will now be given to the situation that linearly polarized light passes through the non-driven-state cells in the above-described liquid crystal cell 104 of VA mode. The liquid crystal cell 104 is birefringent, and its refractive index in the direction of thickness is different from its refractive indices in the direction of plane. Therefore, of the linearly polarized light that has passed through the polarizer 102A on the incident side, the light that has entered the liquid crystal cell 104 along the normal to the liquid crystal cell 104 passes through the liquid crystal cell 104 without undergoing phase shift, but the light that has slantingly entered the liquid crystal cell 104 in the direction deviating from the normal to the liquid crystal cell 104 undergoes phase shift while it passes through the liquid crystal cell 104 and becomes elliptically polarized light. The cause of this phenomenon is that those liquid crystalline molecules, which are vertically oriented in the liquid crystal cell 104 when the cells in the liquid crystal cell 104 of VA mode are in the non-driven state, function as a positive C plate. It is noted that the amount of phase shift that occurs for light passing through the liquid crystal cell 104 (transmitted light) is affected also by the birefringence of the liquid crystalline molecules sealed in the liquid crystal cell 104, the thickness of the liquid crystal cell 104, the wavelength of the transmitted light, and so on.

Owing to the above-described phenomenon, even when the cells in the liquid crystal cell 104 are in the non-driven state and linearly polarized light should pass through the liquid crystal cell 104 as it is and should be blocked by the polarizer 102B on the emergent side, a part of the light emerging slantingly from the liquid crystal cell 104 in the direction deviating from the normal to the liquid crystal cell 104 is to leak from the polarizer 102B on the emergent side.

For this reason, the above-described conventional liquid crystal display 100 has the problem that the display quality at the time when the displayed image is viewed obliquely from a position not on the normal to the liquid crystal cell 104 tends to be poorer than the display quality at the time when this image is viewed from a position right in front of the display (viewing angle dependency problem).

In order to improve the viewing angle dependency of the above-described conventional liquid crystal display 100, a variety of techniques have been developed up to now. Such a liquid crystal display as is described in Japanese Laid-Open Patent Publication No. 67219/1991, for example, has been known as one of these techniques. This liquid crystal display uses a retardation optical element comprising a retardation layer having a cholesteric structure (a birefringent retardation layer), where the retardation optical element is placed between a liquid-crystal cell and a polarizer in order to provide optical compensation.

In the retardation optical element having a cholesteric structure, the selective reflection wavelength given by the equation $\lambda = nav \cdot p$ (p: the helical pitch in the helical structure consisting of liquid crystalline molecules, nav: the mean refractive index on the plane perpendicular to the helical axis) is adjusted so that it is either shorter or longer than the wavelength of transmitted light, as described in Japanese Laid-Open Patent Publication No. 322223/1992, for example.

In the retardation optical element described above, linearly polarized light that has slantingly entered the retardation layer in the direction deviating from the normal to the retardation layer undergoes phase shift, while it passes through the retardation layer, to become elliptically polarized light, as in the case of the above-described liquid crystal cell. The cause of this phenomenon is that the cholesteric structure functions as a negative C plate. The amount of phase shift that occurs for light passing through the retardation layer (transmitted light) is affected also by the birefringence of the liquid crystalline molecules in the retardation layer, the thickness of the retardation layer, the wavelength of the transmitted light, and so on.

It is therefore possible to significantly improve the viewing angle dependency of conventional liquid crystal displays by using the above-described retardation optical element, if the retardation layer contained in the retardation optical element is properly designed so that the phase shift that occurs in a liquid crystal cell of VA mode functioning as a positive C plate and the phase shift that occurs in the retardation layer functioning as a negative C plate cancel each other.

The viewing angle dependency of liquid crystal displays can be improved more significantly by using a retardation layer that functions as a negative C plate (i.e., a retardation layer in which the relationships among its refractive indices Nx and Ny in the direction of plane and its refractive index Nz in the direction of thickness are Nx=Ny>Nz) and a retardation layer that functions as an A plate (i.e., a retardation layer in which the relationships among its refractive indices Nx and Ny in the direction of plane and its refractive index Nz in the direction of thickness are Nx>Ny=Nz) in combination, as described in Japanese Laid-Open Patent Publication No. 258605/1999, for example.

However, it has been found that, in the case where the above-described conventional retardation optical element (a retardation layer having a cholesteric structure, functioning as a negative C plate) is placed between a liquid crystal cell and a polarizer, although viewing angle dependency can be improved, bright-and-dark patterns, etc. can appear on the displayed image to greatly lower the display quality. In particular, it has been found that the display quality lowers drastically when a retardation layer functioning as a negative C plate and a retardation layer functioning as an A plate are, as described above, used in combination for a retardation optical element.

Conducting experiments and computer-aided simulations, the inventor has earnest studies in order to find the reason why such a retardation optical element (comprising a retardation layer functioning as a negative C plate and a retardation layer functioning as an A plate) causes the appearance of bright-and-dark patterns, etc. As a result, the inventor has finally found that this phenomenon is partly attributed to the directions of the directors of liquid crystalline molecules on the surfaces of the retardation layers.

Regarding a circularly-polarized-light-extracting optical element comprising one or more cholesteric liquid crystal layers, the inventor has already made a variety of proposals on the directions of the directors of liquid crystalline molecules on the surfaces of the liquid crystal layer(s) and also on the directions of the directors of liquid crystalline molecules in the vicinity of the interface between two neighboring liquid crystal layers (Japanese Laid-Open Patent Publication No. 189124/2002, and Japanese Patent Application No. 60392/2001 (Japanese Laid-Open Patent Publication No. 258053/2002)). However, these proposals are only for a circularly-polarized-light-extracting optical element comprising a single, cholesteric liquid crystal layer or a plurality of cholesteric liquid crystal layers that are laminated to each other, and a construction suitable for such a retardation optical element (comprising a retardation layer functioning as a negative C plate and a retardation layer functioning as an A plate) as is described above has not yet been completely made clear.

SUMMARY OF THE INVENTION

The present invention has been accomplished under these circumstances. Objects of the present invention are therefore to provide a retardation optical element comprising a retardation layer that functions as a negative C plate and a retardation layer that functions as an A plate, never causing the appearance of bright-and-dark patterns, etc. on the displayed image even when placed between a liquid crystal cell and a polarizer, thus being capable of effectively preventing lowering of display quality; a process of producing the retardation optical element; and a liquid crystal display comprising the retardation optical element.

The present invention provides, as a first aspect for fulfilling the object of the invention, a retardation optical element comprising: a C plate type retardation layer that has a cholesteric structure with liquid crystalline molecules in planar orientation and functions as a negative C plate, the helical pitch in the structure being so adjusted that the C plate type retardation layer selectively reflects, owing to its structure, light whose wavelength falls in a wave range that is different from the wave range of incident light; and an A plate type retardation layer that has a nematic structure, functions as an A plate, and is laminated adjacently to the C plate retardation layer, wherein the directions of the directors of liquid crystalline molecules on one of the two main opposite surfaces of the C plate type retardation layer, situated on the side of the A plate type retardation layer, are substantially the same as the directions of the directors of liquid crystalline molecules on one of the two main opposite surfaces of the A plate type retardation layer, situated on the side of the C plate type retardation layer.

In the above-described first aspect for fulfilling the object of the present invention, it is preferable that the directions of the directors of liquid crystalline molecules on one of the two main opposite surfaces of the C plate type retardation layer, situated on the side of the A plate type retardation layer, be substantially parallel to the directions of the directors of liquid crystalline molecules on the other surface of the C plate type retardation layer, situated on the side apart from the A plate type retardation layer.

Further, in the above-described first aspect for fulfilling the object of the invention, it is preferable that the directions of the directors of liquid crystalline molecules on the surface, on the side apart from the A plate type retardation layer, of the C plate type retardation layer be substantially parallel to the directions of the directors of liquid crystalline molecules on the surface, on the side apart from the C plate type retardation layer, of the A plate type retardation layer.

Furthermore, in the above-described first aspect for fulfilling the object of the invention, it is preferable that the C plate type retardation layer has a helical structure with a pitch number substantially equal to (0.5×integer) between its two main opposite surfaces, that is, the surface on the side of the A plate type retardation layer and the surface on the side apart from the A plate type retardation layer.

Furthermore, in the above-described first aspect for fulfilling the object of the invention, it is preferable that the C plate type retardation layer has a structure of a chiral nematic liquid crystal that is solidified by means of three-dimensional cross-linking or of a polymeric, cholesteric liquid crystal that is solidified into a glassy state.

Furthermore, in the above-described first aspect for fulfilling the object of the invention, it is preferable that the A plate type retardation layer has a structure of a nematic liquid crystal that is solidified by means of three-dimensional cross-linking or of a polymeric, nematic liquid crystal that is solidified into a glassy state.

The present invention provides, as a second aspect for fulfilling the object of the invention, a process of producing a retardation optical element, comprising: applying a first liquid crystal to an alignment layer whose surface has alignment regulation power in substantially one direction on its entire surface, the first liquid crystal having a cholesteric regularity and being so prepared that the liquid crystal when solidified selectively reflects light whose wavelength falls in a wave range that is different from the wave range of incident light; solidifying the first liquid crystal applied, with the directions of the directors of liquid crystalline molecules on a surface of the first liquid crystal being regulated by the alignment regulation power of the alignment layer, thereby forming a C plate type retardation layer that functions as a negative C plate; applying a second liquid crystal directly to the C plate type retardation layer formed, the second liquid crystal having a nematic regularity; and solidifying the second liquid crystal applied, with the directions of the directors of liquid crystalline molecules on the surface, situated on the side of the C plate type retardation layer, of the second liquid crystal being regulated by the alignment regulation power of the surface of the C plate type retardation layer, thereby forming an A plate type retardation layer that functions as an A plate.

In the above-described second aspect for fulfilling the object of the present invention, it is preferable that the first liquid crystal be a liquid crystal comprising at least one of polymerizable cholesteric monomers and oligomers; that the first liquid crystal be solidified by means of three-dimensional cross-linking, with the directions of the directors of liquid crystalline molecules on the surface of the first liquid crystal being regulated by the alignment regulation power of the alignment layer; that the second liquid crystal be a liquid crystal comprising at least one of polymerizable nematic monomers and oligomers; and that the second liquid crystal be solidified by means of three-dimensional cross-linking, with the directions of the directors of liquid crystalline molecules on the surface, situated on the side of the C plate type retardation layer, of the second liquid crystal being regulated by the alignment regulation power of the surface of the C plate type retardation layer.

Further, in the second aspect for fulfilling the object of the present invention, it is preferable that the first liquid crystal be a liquid crystal comprising a cholesteric liquid crystalline polymer; that the first liquid crystal be solidified into a glassy state by cooling, with the directions of the directors of liquid crystalline molecules on the surface of the first liquid crystal being regulated by the alignment regulation power of the alignment layer; that the second liquid crystal be a liquid crystal comprising a nematic liquid crystalline polymer; and that the second liquid crystal be solidified into a glassy state by cooling, with the directions of the directors of liquid crystalline molecules on the surface, situated on the side of the C plate type retardation layer, of the second liquid crystal being regulated by the alignment regulation power of the surface of the C plate type retardation layer.

In the above-described second aspect for fulfilling the object of the invention, it is preferable to adjust the coating thickness of the first liquid crystal so that the directions of the directors of liquid crystalline molecules on the two main opposite surfaces of the C plate type retardation layer are substantially parallel to each other.

Furthermore, in the above-described second aspect for fulfilling the object of the invention, it is preferable to bring another alignment layer into contact with the surface, situated on the side apart from the surface of the above-described alignment layer, of the C plate type retardation layer, so that the liquid crystal is solidified with the directions of the directors of liquid crystalline molecules on the two main opposite surfaces of the C plate type retardation layer being regulated.

Furthermore, in the above-described second aspect for fulfilling the object of the invention, it is preferable to bring another alignment layer into contact with the surface, situated on the side apart from the surface of the C plate type retardation layer, of the A plate type retardation layer, so that the second liquid crystal is solidified with the directions of the directors of liquid crystalline molecules on the two main opposite surfaces of the A plate type retardation layer being regulated.

The present invention provides, as a third aspect for fulfilling the object of the invention, a process of producing a retardation optical element, comprising: applying a first liquid crystal to an alignment layer whose surface has alignment regulation power in substantially one direction on its entire surface, the first liquid crystal having a nematic regularity; solidifying the first liquid crystal applied, with the directions of the directors of liquid crystalline molecules on a surface of the first liquid crystal being regulated by the alignment regulation power of the alignment layer, thereby forming an A plate type retardation layer that functions as an A plate; applying a second liquid crystal directly to the A plate type retardation layer formed, the second liquid crystal having a cholesteric regularity and being so prepared that the liquid crystal when solidified selectively reflects light whose wavelength falls in a wave range that is different from the wave range of incident light; and solidifying the second liquid crystal applied, with the directions of the directors of liquid crystalline molecules on the surface, situated on the side of the A plate type retardation layer, of the second liquid crystal being regulated by the alignment regulation power of the surface of the A plate type retardation layer, thereby forming a C plate type retardation layer that functions as a negative C plate.

In the above-described third aspect for fulfilling the object of the present invention, it is preferable that the first liquid crystal be a liquid crystal comprising at least one of polymerizable nematic monomers and oligomers; that the first liquid crystal be solidified by means of three-dimensional cross-linking, with the directions of the directors of liquid crystalline molecules on the surface of the first liquid crystal being regulated by the alignment regulation power of the alignment layer; that the second liquid crystal be a liquid crystal comprising at least one of polymerizable cholesteric monomers and oligomers; and that the second liquid crystal be solidified by means of three-dimensional cross-linking, with the directions of the directors of liquid crystalline molecules on the surface, situated on the side of the A plate type retardation layer, of the second liquid crystal being regulated by the alignment regulation power of the surface of the A plate type retardation layer.

Further, in the third aspect for fulfilling the object of the present invention, it is preferable that the first liquid crystal be a liquid crystal comprising a nematic liquid crystalline polymer; that the first liquid crystal be solidified into a glassy state by cooling, with the directions of the directors of liquid crystalline molecules on the surface of the first liquid crystal being regulated by the alignment regulation power of the alignment layer; that the second liquid crystal be a liquid crystal comprising a cholesteric liquid crystalline polymer; and that the second liquid crystal be solidified into a glassy state by cooling, with the directions of the directors of liquid crystalline molecules on the surface, situated on the side of the A plate type retardation layer, of the second liquid crystal being regulated by the alignment regulation power of the surface of the A plate type retardation layer.

In the above-described third aspect for fulfilling the object of the invention, it is preferable to adjust the coating thickness of the second liquid crystal so that the directions of the directors of liquid crystalline molecules on the two main opposite surfaces of the C plate type retardation layer are substantially parallel to each other.

Furthermore, in the above-described third aspect for fulfilling the object of the invention, it is preferable to bring another alignment layer into contact with the surface, situated on the side apart from the surface of the A plate type retardation layer, of the C plate type retardation layer, so that the second liquid crystal is solidified with the directions of the directors of liquid crystalline molecules on the two main opposite surfaces of the C plate type retardation layer being regulated.

Furthermore, in the above-described third aspect for fulfilling the object of the invention, it is preferable to bring another alignment layer into contact with the surface, situated on the side apart from the surface of the above-described alignment layer, of the A plate type retardation layer, so that the second liquid crystal is solidified with the directions of the directors of liquid crystalline molecules on the two main opposite surfaces of the A plate type retardation layer being regulated.

The present invention provides, as a fourth aspect for fulfilling the object of the invention, a liquid crystal display comprising: a liquid crystal cell; a pair of polarizers so arranged that the liquid crystal cell is sandwiched therebetween; and a retardation optical element according to the above-described first aspect for fulfilling the object of the invention, placed between the liquid crystal cell and at least one of a pair of the polarizers, wherein, of the light in a predetermined state of polarization, incident on and/or emerging from the liquid crystal cell, the light emerging slantingly in the direction deviating from the normal to the liquid crystal cell is compensated by the retardation optical element for the state of polarization.

According to the retardation optical element of the first aspect for fulfilling the object of the invention, in the retardation optical element comprising a C plate type retardation layer that has a cholesteric structure with liquid crystalline molecules in planar orientation and functions as a negative C plate, and an A plate type retardation layer that has a nematic structure, functions as an A plate, and is laminated adjacently to the C plate type retardation layer, the helical pitch in the structure of the C plate type retardation layer is so adjusted that the C plate type retardation layer selectively reflects, owing to its structure, light whose wavelength falls in a wave range that is different from the wave range of incident light, and the directions of the directors of liquid crystalline molecules on the two neighboring surfaces of the C plate type retardation layer and the A plate type retardation layer are made substantially the same. Therefore, the retardation optical element never causes the appearance of bright-and-dark patterns, etc. on the displayed image even when placed between a liquid crystal cell and a polarizer and can thus effectively prevent lowering of display quality.

In the retardation optical element according to the first aspect for fulfilling the object of the invention, by making the directions of the directors of liquid crystalline molecules on the two main opposite surfaces of the C plate type retardation layer be substantially parallel to each other, it is possible to more effectively prevent the appearance of bright-and-dark patterns, etc., and is thus possible to further prevent lowering of display quality.

Further, in the retardation optical element according to the first aspect for fulfilling the object of the invention, by making, substantially parallel to each other, the directions of the directors of liquid crystalline molecules on the two main opposite surfaces, not in contact with each other, of the C plate type retardation layer and the A plate type retardation layer that are laminated adjacently to each other, it is possible to more effectively prevent the appearance of bright-and-dark patterns, etc.

Furthermore, in the retardation optical element according to the first aspect for fulfilling the object of the invention, by forming the C plate type retardation layer to have a helical structure with a pitch number substantially equal to (0.5× integer) between its two main opposite surfaces, it is possible to make the directions of the directors of liquid crystalline molecules on the two main opposite surfaces of the C plate type retardation layer be the same with high accuracy. By this, it is possible to prevent the appearance of bright-and-dark patterns, etc. more effectively and is thus possible to further prevent lowering of display quality.

According to the process of producing a retardation optical element of the second aspect for fulfilling the object of the present invention, a first liquid crystal having a cholesteric regularity is applied to an alignment layer whose surface has alignment regulation power in substantially one direction on its entire surface, thereby forming a C plate type retardation layer that functions as a negative C plate, and a second liquid crystal having a nematic regularity is then applied directly to this C plate type retardation layer to form an A plate type retardation layer that functions as an A plate. Thus, it is possible to easily produce a retardation optical element comprising a retardation layer that functions as a negative C plate and a retardation layer that functions as an A plate, never causing the appearance of bright-and-dark patterns, etc. on the displayed image, thus being capable of effectively preventing lowering of display quality.

According to the process of producing a retardation optical element of the third aspect for fulfilling the object of the invention, a first liquid crystal having a nematic regularity is applied to an alignment layer whose surface has alignment regulation power in substantially one direction on its entire surface, thereby forming an A plate type retardation layer that functions as an A plate, and a second liquid crystal having a cholesteric regularity is then applied directly to this A plate type retardation layer to form a C plate type retardation layer that functions as a negative C plate. Thus, it is possible to easily produce a retardation optical element comprising a retardation layer that functions as a negative C plate and a retardation layer that functions as an A plate, never causing the appearance of bright-and-dark patterns, etc. on the displayed image, thus being capable of effectively preventing lowering of display quality.

According to the fourth aspect for fulfilling the object of the present invention, a retardation optical element is placed between a liquid crystal cell and a polarizer in a liquid crystal display, whereby, of the light in a predetermined state of polarization, incident on and/or emerging from the liquid crystal cell, the light slantingly emerging in the direction deviating from the normal to the liquid crystal cell is compensated by the retardation optical element for the state of polarization. Thus, it is possible to prevent the appearance of bright-and-dark patterns, etc. on the liquid crystal display and, at the same time, improve contrast. Lowering of display quality can thus be avoided.

BEST MODE FOR CARRYING OUT THE INVENTION

Embodiments of the present invention will be described hereinafter with reference to the accompanying drawings.

A retardation optical element according to an embodiment is firstly described with reference to FIG. 1.

Figure 1:
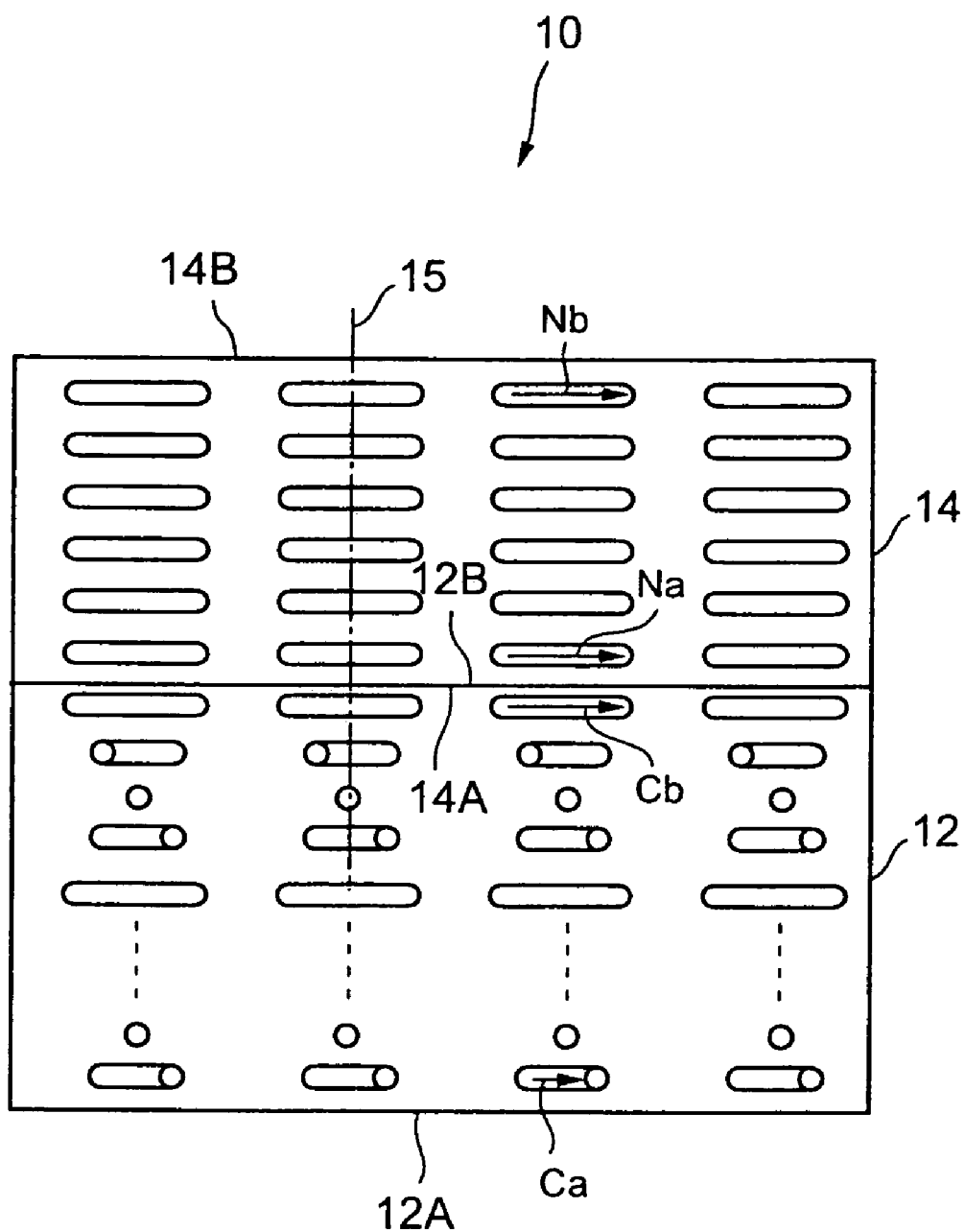
FIG. 1 is an enlarged perspective view diagrammatically showing a part of a retardation optical element according to an embodiment of the present invention.

As shown in FIG. 1, a retardation optical element 10 comprises: a C plate type retardation layer 12 having a cholesteric structure with liquid crystalline molecules in planar orientation; and an A plate retardation layer 14 having a nematic structure, laminated adjacently to the C plate type retardation layer 12.

Of the two retardation layers, the C plate type retardation layer 12 has two main opposite surfaces (surfaces with larger areas) 12A and 12B that are perpendicular to the direction of thickness (the direction of the normal 15). The C plate type retardation layer 12 is anisotropic, that is, birefringent, owing to its cholesteric structure, and its refractive index in the direction of thickness is different from its refractive indices in the direction of plane, so that this retardation layer 12 functions as a negative C plate. Namely, in the three-dimensional rectangular coordinates, when the refractive indices of the C plate type retardation layer 12 in the direction of plane are indicated by Nx and Ny and the refractive index in the direction of thickness, by Nz, the relationships among these refractive indices are Nx=Ny>Nz.

Further, the A plate type retardation layer 14 has two main opposite surfaces (surfaces with larger areas) 14A and 14B that are perpendicular to the direction of thickness (the direction of the normal 15). The A plate type retardation layer 14 is anisotropic, that is, birefringent, owing to its nematic structure, and its refractive indices in the direction of plane are different from each other, so that this retardation layer 14 functions as a (positive) A plate. Namely, in the three-dimensional rectangular coordinates, when the refractive indices of the A plate type retardation layer 14 in the direction of plane are indicated by Nx and Ny and the refractive index in the direction of thickness, by Nz, the relationships among these refractive indices are Nx>Ny=Nz.

The directions of the directors Cb of liquid crystalline molecules on the surface 12B, situated on the A plate type retardation layer 14 side, of the C plate type retardation layer 12 are substantially the same as the directions of the directors Na of liquid crystalline molecules on the surface 14A, situated on the C plate type retardation layer 12 side, of the A plate type retardation layer 14. The dispersion in the directions of the directors Cb of liquid crystalline molecules on the surface 12B of the C plate type retardation layer 12 and of the directors Na of liquid crystalline molecules on the surface 14A of the A plate type retardation layer 14 are within ±10°, preferably within ±5°, more preferably within ±1°.

The expression "substantially the same" as used herein encompasses the case where the directions of the directors of liquid crystalline molecules are different by an angle of nearly 180°, that is, the head of a liquid crystalline molecule and the tail of another one are in the same direction. This is because, in many cases, the head of a liquid crystalline molecule is optically indistinguishable from its tail. The same is true for the cases that will be described later (the case where the directions of the directors Ca and Cb of liquid crystalline molecules on the two main opposite surfaces 12A and 12B of the C plate type retardation layer 12 are "substantially parallel" to each other, and the case where the directions of the directors Ca and Nb of liquid crystalline molecules on the two surfaces 12A and 14B, not in contact with each other, of the C plate type retardation 12 and the A plate type retardation layer 14 are "substantially parallel" to each other).

The term "liquid crystalline molecules" is usually used to indicate those molecules that have both the fluidity of liquid and the anisotropy of crystal. In this specification, however, this term "liquid crystalline molecules" is, for convenience' sake, used also to indicate those molecules that have been solidified with the anisotropy which the molecules possessed when they were in the fluid state retained. Examples of methods for solidifying molecules while retaining the anisotropy which the molecules possessed when they were in the fluid state include a method in which liquid crystalline molecules having polymerizable groups (polymerizable monomer or oligomer molecules) are cross-linked, and a method in which a polymeric liquid crystal (liquid crystalline polymer) is cooled to a temperature below its glass transition temperature.

It is preferable that the directions of the directors Ca of liquid crystalline molecules on one surface 12A of the two main opposite surfaces of the C plate type retardation layer 12 be substantially the same and that the directions of the directors Cb of liquid crystalline molecules on the other surface 12B of the C plate type retardation layer 12 be also substantially the same. It is herein preferable that the dispersion in the directions of the directors Ca and Cb of liquid crystalline molecules on one surface 12A and the other surface 12B of the C plate type retardation layer 12 be within ±10°, preferably within ±5°, more preferably within ±1°.

Whether the directions of the directors Ca and Cb of the liquid crystalline molecules on the surfaces 12A and 12B of the C plate type retardation layer 12 are substantially the same or not can be judged from the observation of the cross section of the C plate type retardation layer 12, using a transmission electron microscope. Specifically, when the cross section of the C plate type retardation layer 12 solidified with its liquid crystal structure kept cholesteric is examined using a transmission electron microscope, bright-and-dark patterns corresponding to the pitches of the molecular helixes, characteristic of a cholesteric liquid crystal structure, are observed. Therefore, if the bright-and-dark patterns that appear on each surface 12A or 12B are seen almost uniformly over the plane in terms of brightness, it can be judged that the directions of the directors of liquid crystalline molecules on this plane are substantially the same.

In the retardation optical element 10 shown in FIG. 1, the C plate type retardation layer 12 having a cholesteric structure, functioning as a negative C plate, is birefringent, and its refractive index in the direction of thickness is different from its refractive indices in the direction of plane. Therefore, although linearly polarized light that enters the C plate type retardation layer 12 along the normal 15 to it is transmitted without undergoing phase shift, linearly polarized light that slantingly enters the C plate type retardation layer 12 in the direction deviating from the normal 15 to it undergoes phase shift while the light passes through the C plate type retardation layer 12 and becomes elliptically polarized light. In contrast with this, if elliptically polarized light slantingly enters the C plate type retardation layer 12 in the direction deviating from the normal 15 to it, the C plate type retardation layer 12 can also convert this elliptically polarized light into linearly polarized light.

On the other hand, also the A plate type retardation layer 14 having a nematic structure, functioning as an A plate, is birefringent, provided that its refractive indices in the direction of plane are different from each other. Namely, even in the direction along the surfaces 14A and 14B, the refractive index in the direction of the director Na or Nb is different from that in the direction perpendicular to the director Na or Nb. It is noted that the refractive index in the direction perpendicular to the director Na or Nb is equal to the refractive index in the direction of thickness.

For this reason, by making a retardation optical element by the combination use of these two retardation layers (the C plate type retardation layer 12 and the A plate type retardation layer 14), the types of birefringence of the retardation layers being different in direction, it is possible to cause phase shift to both light passing through the retardation optical element in the direction of the normal 15 and light passing through the retardation optical element in the direction deviating from the normal 15, and is thus possible to provide various types of optical compensation.

In this retardation optical element, the C plate type retardation layer 12 and the A plate type retardation layer 14 are laminated adjacently to each other, and the directions of the directors Cb of liquid crystalline molecules on the surface 12B of the C plate type retardation layer 12 and the directions of the directors Na of liquid crystalline molecules on the surface 14A of the A plate type retardation layer 14, the surface 12B and the surface 14A being in contact with each other, are substantially the same. Thus, the retardation optical element never causes the appearance of bright-and-dark patterns, etc. on the displayed image even when placed between a liquid crystal cell and a polarizer in a liquid crystal display. The retardation optical element can thus effectively prevent lowering of display quality.

In the C plate type retardation layer 12, the helical pitch in its structure is so adjusted that the C plate type retardation layer 12 selectively reflects, owing to its cholesteric structure, light whose wavelength falls in a wave range that is different from the wave range of incident light (the wave range in which the wavelength of light to be selectively reflected falls is either shorter or longer than the wavelength of incident light). If the helical pitch is so adjusted, even when the incident light is, for example, visible light, the incident light (visible light) is never reflected by means of selective reflection that occurs owing to the helical structure consisting of liquid crystalline molecules, and such problems as coloring never occur.

A brief explanation for selective reflection, a phenomenon in the C plate type retardation layer 12 having a cholesteric structure, will be given below.

A cholesteric structure has the rotated-light-selecting property (polarized-light-separating property) of separating a component optically rotated (circularly polarized) in one direction from a component optically rotated in the opposite direction, according to the planar orientation of a liquid crystal.

This phenomenon is known as circular dichroism. If the direction of rotation of liquid crystalline molecules in the helical structure is properly selected, a component circularly polarized in the same direction as this direction of rotation is selectively reflected.

In this case, the scattering of polarized light is maximized (the selective reflection peaks) at the wavelength $\lambda 0$ given by the following equation (1):

$$\lambda 0 = n_{av} \cdot p, \quad (1)$$

wherein p is the helical pitch in the helical structure consisting of liquid crystalline molecules, and nav is the mean refractive index on a plane perpendicular to the helical axis.

On the other hand, the width $\Delta \lambda$ of the wave range in which the wavelength of light to be selectively reflected falls is given by the following equation (2):

$$\Delta \lambda = \Delta n \cdot p, \quad (2)$$

wherein $\Delta n$ is the value of birefringence which is defined as a difference between the index of refraction for normal light and that of refraction for abnormal light.

Namely, of the unpolarized light incident on such a cholesteric structure, either a right- or left-handed circularly polarized light component in the selective reflection wave range with the central wavelength $\lambda 0$ and the width $\Delta \lambda$ is reflected owing to the above-described polarized-light-separating property, and the other circularly polarized light component and light (unpolarized light) not in this selective reflection wave range are transmitted. It is noted that the right- or left-handed circularly polarized light component is reflected without undergoing reversion of the direction of rotation unlike in the case of ordinary reflection of light.

Since visible light that causes coloring is in a wave range between 380 nm and 780 nm, it is preferable to make the cholesteric structure so that the wavelength of light to be selectively reflected owing to the cholesteric structure is either 380 nm or less, or 780 or more. By so making the cholesteric structure, it is possible to prevent such problems as coloring that occurs when incident light (visible light) is reflected, while allowing the C plate type retardation layer 12 to function as a negative C plate. That the wavelength of light to be selectively reflected is shorter than that of incident light is more preferable because, in this case, the rotatory polarization action decreases.

Next, a modification of the retardation optical element according to this embodiment will be described with reference to FIG. 2.

Figure 2:
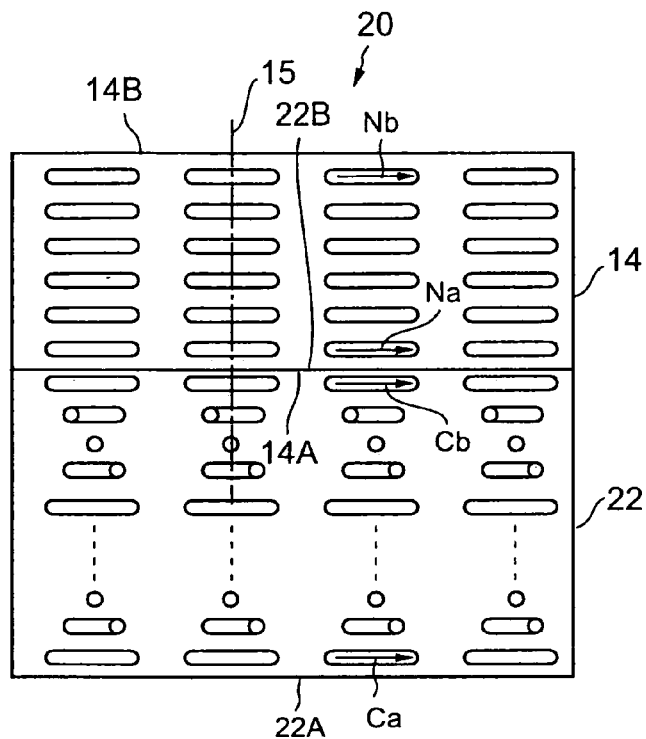
FIG. 2 is an enlarged perspective view diagrammatically showing a part of a modification of the retardation optical element according to an embodiment of the present invention.

As shown in FIG. 2, a retardation optical element 20 comprises: a C plate type retardation layer 22 having a cholesteric structure with liquid crystalline molecules in planar orientation; and an A plate type retardation layer 14 having a nematic structure, laminated adjacently to the C plate type retardation layer 22.

Of these two retardation layers, the C plate type retardation layer 22 functions as a negative C plate like the C plate type retardation layer 12 in the retardation optical element 10 shown in FIG. 1, and has two main opposite surface (surfaces with larger areas) 22A and 22B that are perpendicular to the direction of thickness (the direction of the normal 15).

The directions of the directors Cb of liquid crystalline molecules on the surface 22B, situated on the A plate type retardation layer 14 side, one of the two main opposite surfaces 22A and 22B of the C plate type retardation layer 22, are substantially parallel to the directions of the directors Ca of liquid crystalline molecules on the other surface 22A, situated on the side apart from the A plate type retardation layer 14. It is preferable that the angle made by the direction (mean direction) of the directors Cb of liquid crystalline molecules on one surface 22B of the C plate type retardation layer 22 and the direction (mean direction) of the directors Ca of liquid crystalline molecules on the other surface 22A of the C plate type retardation layer 22 be within ±10°, preferably within ±5°, more preferably within ±1°.

Further, the directions of the directors Ca of liquid crystalline molecules on the surface 22A, situated on the side apart from the A plate type retardation layer 14, of the C plate type retardation layer 22 are substantially parallel to the directions of the directors Nb of liquid crystalline molecules on the surface 14B, situated on the side apart from the C plate type retardation layer 22, of the A plate type retardation layer 14. It is preferable that the angle made by the direction (mean direction) of the directors Ca of liquid crystalline molecules on the surface 22A of the C plate type retardation layer 22 and the direction (mean direction) of the directors Nb of liquid crystalline molecules on the surface 14B of the A plate type retardation layer 14 be within ±10°, preferably within ±5°, more preferably within ±1°.

Figure 3:
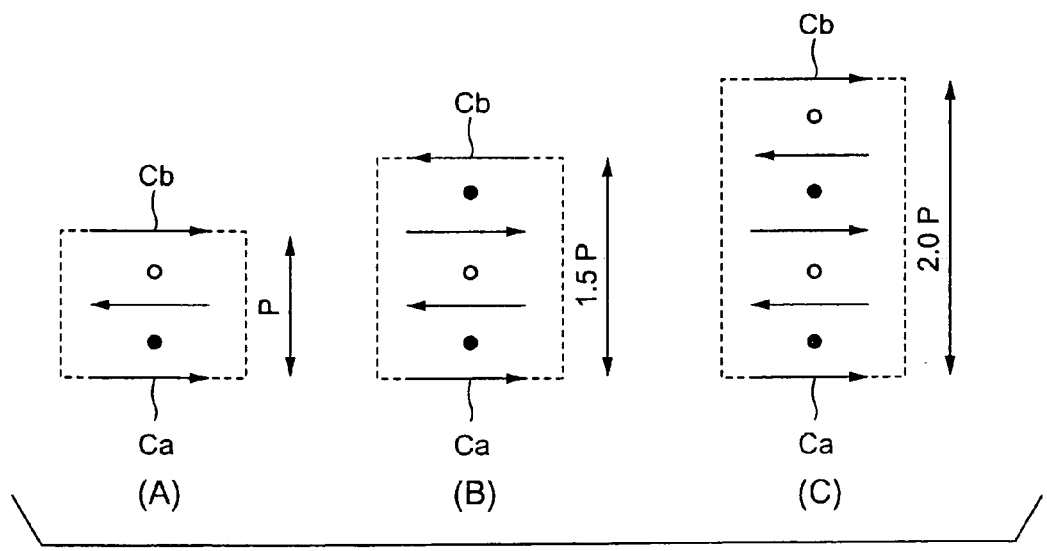
FIG. 3 is a diagrammatic view showing the relationship between the helical pitch in the cholesteric, helical structure consisting of liquid crystalline molecules and the directors of liquid crystalline molecules on the surfaces of a retardation layer.

In the retardation optical element 20 shown in FIG. 2, in order to make the directions of the directors Ca and Cb on the two main opposite surfaces 22A and 22B of the C plate type retardation layer 22 be the same (i.e., parallel to each other) with high accuracy, it is proper to make the thickness of the C plate type retardation layer 22 equal to (0.5×integer) times the helical pitch p in the cholesteric structure (helical structure), thereby forming, between the surfaces 22A and 22B, a helical structure with a pitch number substantially equal to (0.5×integer). If so made, the thickness can optically be divided, without a remainder, by a half of the helical pitch p in the cholesteric structure consisting of liquid crystalline molecules, as diagrammatically shown in FIGS. 3(A), 3(B) and 3(C), for example. There can thus be avoided optical deviation from the above equation (1) which is a simplified theoretical equation, especially disturbance of the state of polarization that is caused by phase shift that occurs for the light entering along the helical axis.

The retardation optical element 20 shown in FIG. 2 is basically the same as the retardation optical element 10 shown in FIG. 1 except the structure of the C plate type retardation layer functioning as a negative C plate, so that the detailed explanations for the other points of the construction of the retardation optical element 20 are omitted.

It is possible to use, as materials for the C plate type retardation layers 12 and 22 and the A plate type retardation layer 14 of the retardation optical elements 10 and 20, three-dimensionally cross-linkable liquid crystalline monomers and oligomers (polymerizable monomers and oligomers), as well as polymeric liquid crystals (liquid crystalline polymers) that can be solidified into its glassy state by cooling.

In the case where the C plate type retardation layers 12 and 22 and the A plate type retardation layer 14 are made from three-dimensionally cross-linkable, polymerizable monomers, it is possible to use mixtures of liquid crystalline monomers and chiral compounds such as are disclosed in Japanese Laid-Open Patent Publication No. 258638/1995 and Published Japanese Translation No. 508882/1998 of PCT International Publication for Patent Application. If three-dimensionally cross-linkable, polymerizable oligomers are used, it is desirable to use cyclic organopolysiloxane compounds or the like having cholesteric phases such as are disclosed in Japanese Laid-Open Patent Publication No. 165480/1982. By "three-dimensional cross-linking" is herein meant that polymerizable monomer or oligomer molecules are three-dimensionally polymerized to give a network structure. By making the molecules into such a state, it is possible to optically fix the liquid crystalline molecules while maintaining their structure cholesteric or nematic, and is thus possible to obtain a film that is easy to handle as an optical film and stable at normal temperatures.

The case where three-dimensionally cross-linkable, polymerizable monomers are used is now taken as an example. If a liquid crystalline monomer is made into a liquid crystal phase at a predetermined temperature, it becomes a nematic liquid crystal. If a chiral agent is added to this liquid crystalline monomer, a chiral nematic liquid crystal (cholesteric liquid crystal) can be obtained. More specifically, it is possible to use liquid crystalline monomers represented by the general formulae (1) to (11), for example. In liquid crystalline monomers represented by the general formula (11), X is preferably an integer of 2 to 5.

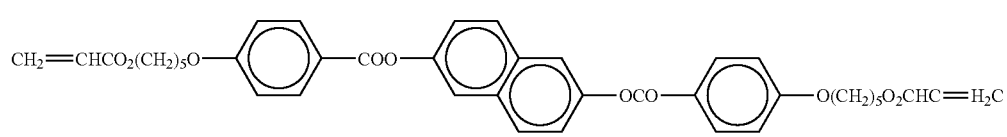

(1)

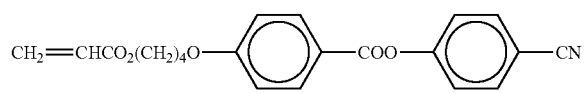

(2)

-continued
(3)
(4)
(5)
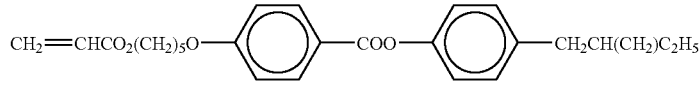
(6)
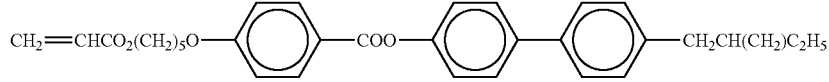
(7)
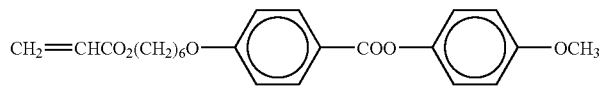
(8)
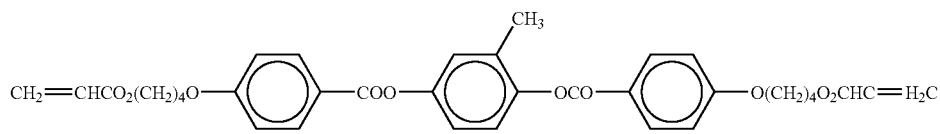
(9)
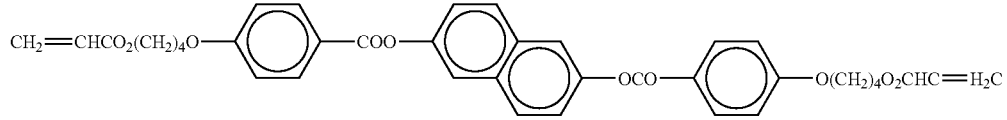
(10)
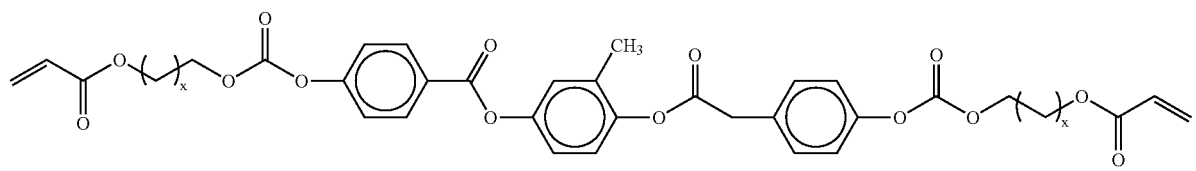
(11)
It is preferable to use, as the chiral agent, those compounds represented by the general formulae (12) to (14), for example. In chiral agents having the general formulae (12) and (13), X is preferably an integer of 2 to 12. In chiral agents having the general formula (14), X is preferably an integer of 2 to 5. In the general formula (12), $R^4$ is hydrogen or methyl group.
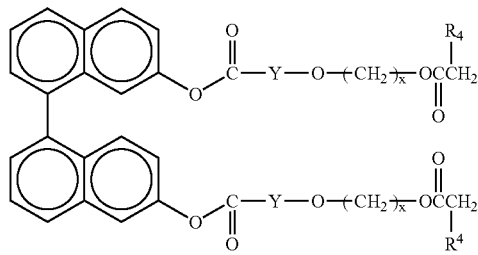
(12)
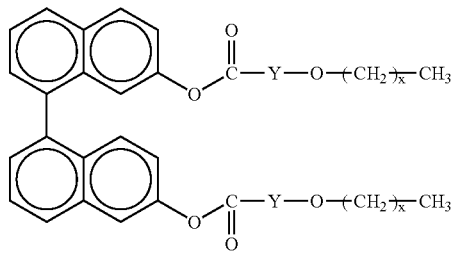
(13)

-continued

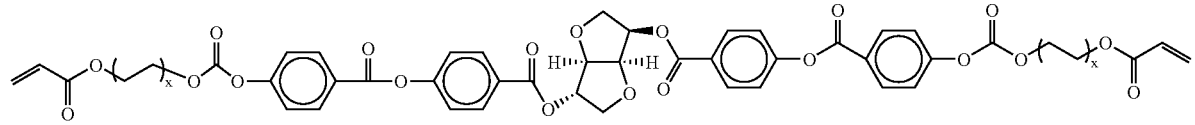

(14)

On the other hand, in the case where the C plate type retardation layers 12 and 22 and the A plate type retardation layer 14 are made from liquid crystalline polymers, it is possible to use polymers containing mesogen groups, which make the polymers liquid crystalline, in their main or side chains, or in both their main and side chains; polymeric, cholesteric liquid crystals having cholesteryl groups in their side chains; such liquid crystalline polymers as are disclosed in Japanese Laid-Open Patent Publication No. 133810/1997; such liquid crystalline polymers as are disclosed in Japanese Laid-Open Patent Publication No. 293252/1999; and so forth.

Next, a process of producing the retardation optical element 10 (20) of the above-described construction according to this embodiment will be described below.

First Production Process

Firstly, a production process that is employed in the case where polymerizable monomers or oligomers are used as materials for the C plate type retardation layer 12 (22) and for the A plate type retardation layer 14 will be described with reference to FIGS. 4(A) to 4(E).

(1) Formation of C Plate Type Retardation Layer

Figure 4:
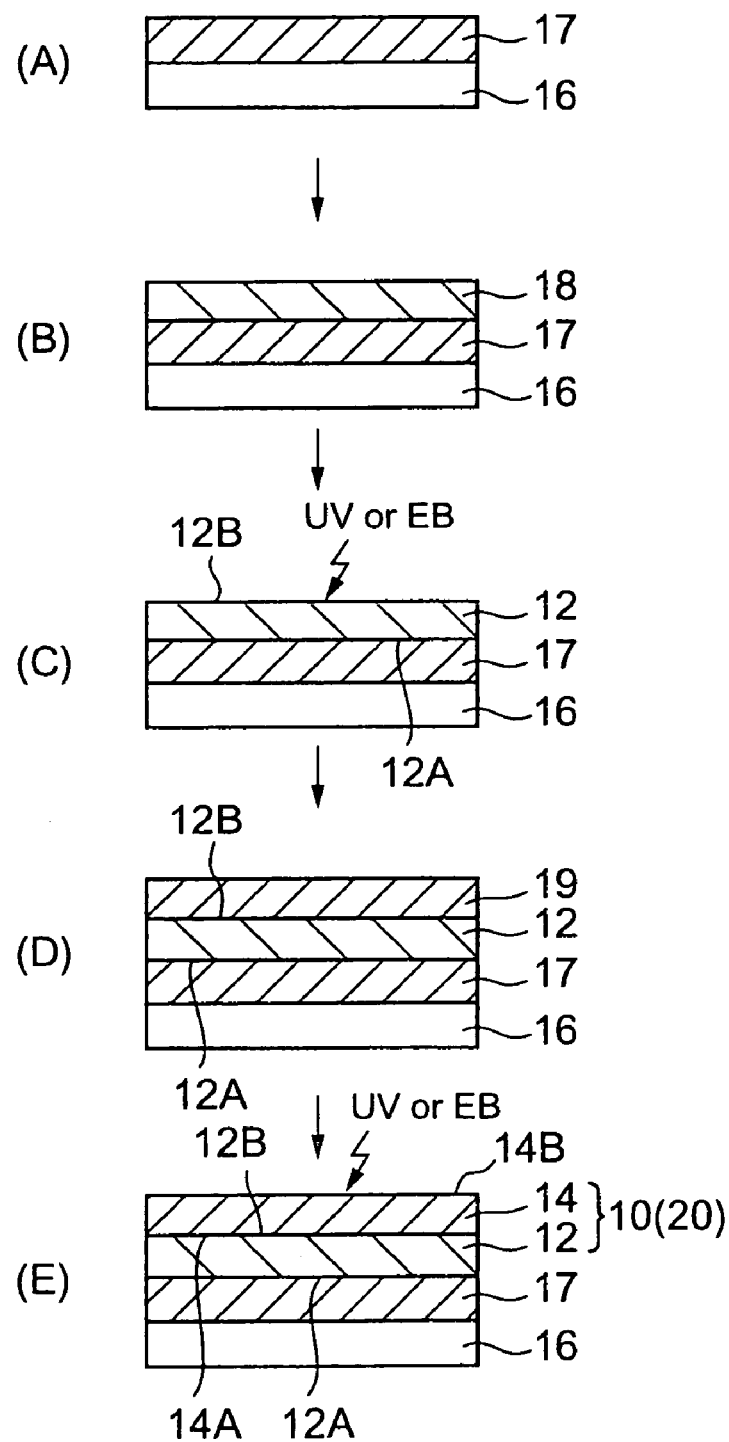
FIG. 4 is a diagrammatic cross-sectional view for explaining a first process of producing a retardation optical element according to an embodiment of the present invention.

In this case, an alignment layer 17 is formed in advance on a glass substrate or a polymeric film such as a TAC (cellulose triacetate) film 16, as shown in FIG. 4(A). A polymerizable monomer (or polymerizable oligomer) 18 that is cholesteric is then applied to this alignment layer 17, as shown in FIG. 4(B), and is aligned by the alignment regulation power of the alignment layer 17. At this time, the polymerizable monomer (or polymerizable oligomer) 18 applied forms a liquid crystal layer.

In the case where the polymerizable monomer (or polymerizable oligomer) 18 is made into a liquid crystal layer at a predetermined temperature, this liquid crystal layer becomes nematic. If any chiral agent is added to this nematic liquid crystal, a chiral nematic liquid crystal (cholesteric liquid crystal) is obtained. Specifically, it is proper to add a chiral agent to the polymerizable monomer or oligomer in an amount of approximately several percents to 10%, for example. By varying the chiral power by changing the type of the chiral agent to be added, or by varying the concentration of the chiral agent in the polymerizable monomer or oligomer, it is possible to control the wavelength of light to be selectively reflected owing to the molecular structure of the polymerizable monomer or oligomer. The polymerizable monomer (or polymerizable oligomer) 18 is herein so prepared that the resulting solid polymer selectively reflects light whose wavelength falls in a wave range that is different from the wave range of incident light.

In order to decrease the viscosity of the polymerizable monomer (or polymerizable oligomer) 18 for easy application, it may be dissolved, as needed, in a solvent such as toluene or MEK to give a coating liquid. In this case, it is necessary to effect the drying step of evaporating the solvent before the step of three-dimensionally cross-linking the polymerizable monomer (or polymerizable oligomer) 18 by the application of ultraviolet light or an electron beam. Preferably, after effecting the step of applying the coating liquid, the drying step is effected to evaporate the solvent; subsequently, the layer applied is held at a temperature at which it becomes a liquid crystal layer, and the step of aligning the liquid crystal is then effected.

Next, with this state of alignment retained, that is, with the directions of the directors of liquid crystalline molecules on the surface, on the alignment layer 17 side, of the polymerizable monomer (or polymerizable oligomer) 18 being regulated by the alignment regulation power of the surface of the alignment layer 17, the polymerization of the polymerizable monomer (or polymerizable oligomer) 18 is, as shown in FIG. 4(C), initiated by the combination use of a photopolymerization initiator previously added and ultraviolet light externally applied, or initiated directly by the application of an electron beam, thereby three-dimensionally cross-linking (polymerizing) the polymerizable monomer (or polymerizable oligomer) 18 for solidification. Thus, there is formed a C plate type retardation layer 12 that functions as a negative C plate such as is described above.

In the above process, if the alignment layer 17 is so formed that its entire surface exerts alignment regulation power in substantially one direction, the directions of the directors of liquid crystalline molecules on the surface 12A, in contact with the alignment layer 17, of the C plate type retardation layer 12 can be made substantially the same over the contact face.

In this case, in order to make the directions of the directors of liquid crystalline molecules on the surface 12B, situated on the side apart from the alignment layer 17, of the C plate type retardation layer 12 be substantially the same over the entire area of the surface 12B, it is proper to make the thickness of the C plate type retardation layer 12 uniform. Further, as shown in FIGS. 5(A) to 5(D), a second alignment layer 17A may be laid on the polymerizable monomer (polymerizable oligomer) 18 (FIG. 5(C)) after applying the polymerizable monomer (polymerizable oligomer) 18 to the alignment layer 17 and before three-dimensionally cross-linking the polymerizable monomer (polymerizable oligomer) 18 in a series of the steps shown in FIGS. 4(A) to 4(C). By doing so, it is possible to make, with higher certainty, the directions of the directors of liquid crystalline molecules on the surface 12B of the C plate type retardation layer 12 be substantially the same over the entire area of the surface 12B.

In this condition, the polymerizable monomer (polymerizable oligomer) 18 present between the alignment layer 17 and the second alignment layer 17A is three-dimensionally cross-linked by the application of ultraviolet light or an electron beam, as in the step shown in FIG. 4(C). Thus, there is formed a C plate type retardation layer 12 that functions as a negative C plate such as is mentioned previously (FIG. 5(D)).

It is proper to separate the second alignment layer 17A from the C plate type retardation layer 12 after the step of applying ultraviolet light or an electron beam.

It is possible to form the alignment layer 17 and/or second alignment layer 17A by a conventionally known method. For example, the alignment layer may be formed by a method in which a PI (polyimide) or PVA (polyvinyl alcohol) film is formed on a glass substrate or a polymeric film such as a TAC film 16 such as is described above and is then rubbed, or a method in which a polymeric compound film capable of serving as an optical alignment layer is formed on a glass substrate or a polymeric film such as a TAC film 16 and is irradiated with polarized UV (ultraviolet light). Moreover, oriented PET (polyethylene terephthalate) films, etc. may also be used for the alignment layer 17 and/or second alignment layer 17A.

In the case where a polymeric film such as a TAC film (organic material) is used as the substrate on which the alignment layer 17 is formed, it is preferable to previously provide a barrier layer having resistance to solvents, such as a PVA (polyvinyl alcohol) layer, on the polymeric film, so that the substrate is not damaged by a solvent in which the polymerizable monomer (or polymerizable oligomer) 18 is dissolved to give a coating liquid; the coating liquid is then applied to this barrier layer. In the case where a PVA layer is used as the barrier layer, if this PVA layer is rubbed, the barrier layer is to serve also as an alignment layer.

(2) Formation of a Plate Type Retardation Layer

Thereafter, as shown in FIG. 4(D), separately-prepared another polymerizable monomer (or polymerizable oligomer) 19 that is nematic and develops a nematic liquid crystal phase at a predetermined temperature is applied directly to the C plate type retardation layer 12 that has been formed in the above-described manner, and is aligned by the alignment regulation power of the surface 12B of the C plate type retardation layer 12. At this time, the polymerizable monomer (or polymerizable oligomer) 19 applied forms a liquid crystal layer.

In order to decrease the viscosity of the polymerizable monomer (or polymerizable oligomer) 19 for easy application, it may be dissolved, as needed, in a solvent such as toluene or MEK to give a coating liquid, as in the case of the polymerizable monomer (or polymerizable oligomer) 18. In this case, it is necessary to effect the drying step of evaporating the solvent before the step of three-dimensionally cross-linking the polymerizable monomer (or polymerizable oligomer) 19 by the application of ultraviolet light or an electron beam. Preferably, after effecting the step of applying the coating liquid, the drying step is effected to evaporate the solvent; subsequently, the layer applied is held at a temperature at which it becomes a liquid crystal layer, and the step of aligning the liquid crystal is then effected.

Next, with this state of alignment retained, that is, with the directions of the directors of liquid crystalline molecules on the surface, situated on the C plate type retardation layer 12 side, of the polymerizable monomer (or polymerizable oligomer) 19 being regulated by the alignment regulation power of the surface of the C plate type retardation layer 12, the polymerization of the polymerizable monomer (or polymerizable oligomer) 19 is, as shown in FIG. 4(E), initiated by the combination use of a photopolymerization initiator previously added and ultraviolet light externally applied, or initiated directly by the application of an electron beam, thereby three-dimensionally cross-linking (polymerizing) the polymerizable monomer (or polymerizable oligomer) 19 for solidification. Thus, there is formed an A plate type retardation layer 14 that functions as an A plate such as is described above.

In order to make the directions of the directors of liquid crystalline molecules on the surface 14B, situated on the side apart from the C plate type retardation layer 12, of the A plate type retardation layer 14 be substantially the same over the entire area of the surface 14B, it is proper to make the thickness of the C plate type retardation layer 12 uniform, and, at the same time, the thickness of the A plate type retardation layer 14 uniform. Alternatively, when conducting three-dimensional cross-linking for solidifying the C plate type retardation layer 12, such a second alignment layer 17A as is shown in FIGS. 5(A) to 5(D) may be used, and, in addition, when conducting three-dimensional cross-linking for solidifying the A plate type retardation layer 14, a second alignment layer that is the same as the second alignment layer 17A shown in FIGS. 5(C) and 5(D) may be provided on the surface, situated on the side apart from the surface 12B of the C plate type retardation layer 12, of the polymerizable monomer (polymerizable oligomer) 19.

Figure 5:
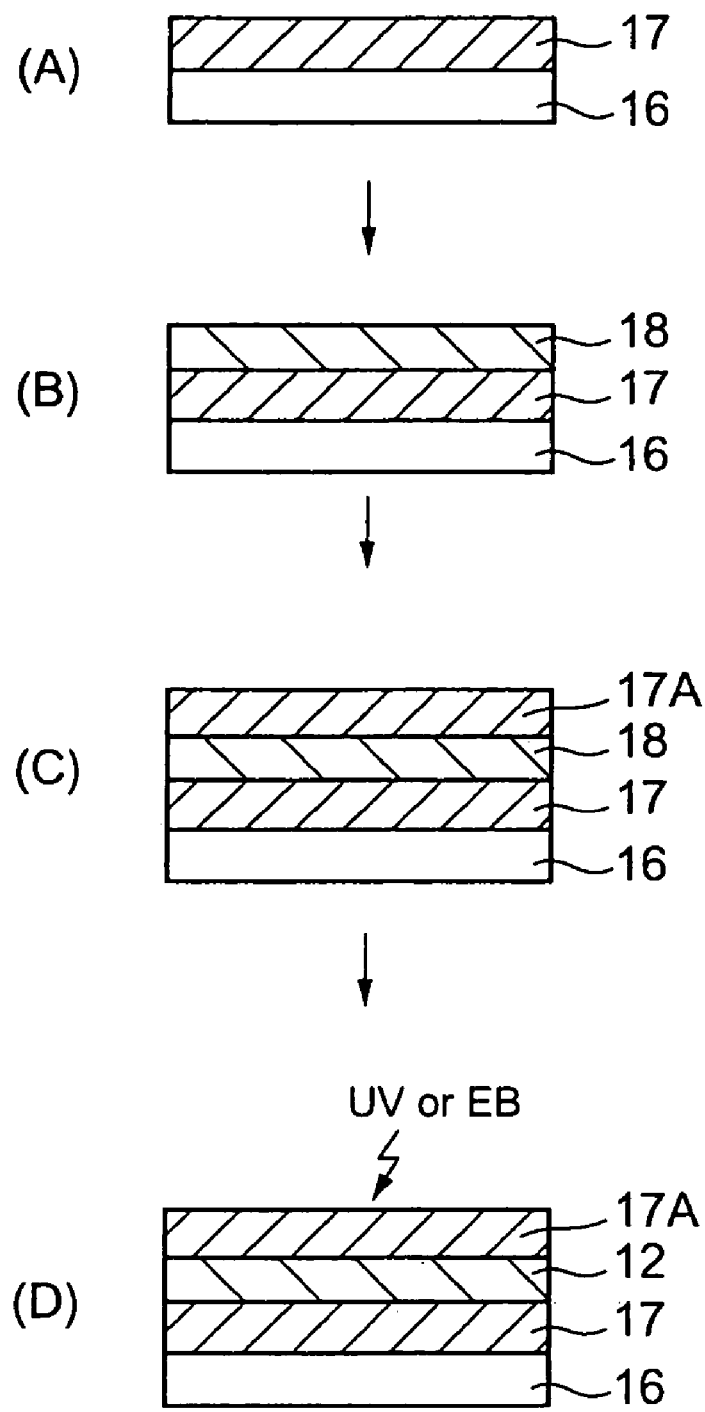
FIG. 5 is a diagrammatic cross-sectional view for explaining a modification of the first process of producing a retardation optical element according to an embodiment of the present invention.

In producing the retardation optical element 20 shown in FIG. 2, it is necessary to make the directions of the directors Cb of liquid crystalline molecules on the surface 22B, situated on the side apart from the alignment layer 17, of the C plate type retardation layer 22 be the same as the directions of the directors Ca of liquid crystalline molecules on the surface 22A, situated on the alignment layer 17 side, of the C plate type retardation layer 22, and to make the directions of the directors Nb of liquid crystalline molecules on the surface 14B, situated on the side apart from the C plate type retardation layer 22, of the A plate type retardation layer 14 be the same as the directions of the directors Ca of liquid crystalline molecules on the surface 22A, situated on the side apart from the A plate type retardation layer 14, of the C plate type retardation layer 22. To fulfill the above requirements, it is proper to adjust the coating thickness of a liquid crystal so that the thickness of the C plate type retardation layer 22 and that of the A plate type retardation layer 14 are equal to (0.5×integer) times the helical pitch in the helical structure consisting of liquid crystalline molecules. Alternatively, such a second alignment layer 17A as is shown in FIGS. 5(C) and 5(D) may be used. If used, the second alignment layer 17A is brought into contact with the surface 22B, situated on the side opposite to the alignment layer 17, of the C plate type retardation layer 22, or with the surface 14B, situated on the side opposite to the C plate type retardation layer 22, of the A plate type retardation layer 14.

Thus, there is produced a retardation optical element 10 (20) in which the C plate type retardation layer 12 (22) and the A plate type retardation layer 14 are laminated adjacently to each other.

Second Production Process

Next, a production process that is employed in the case where liquid crystalline polymers are used as materials for the C plate type retardation layer 12 (22) and for the A plate type retardation layer 14 will be described with reference to FIGS. 6(A) to 6(E).

(1) Formation of C Plate Type Retardation Layer

Figure 6:
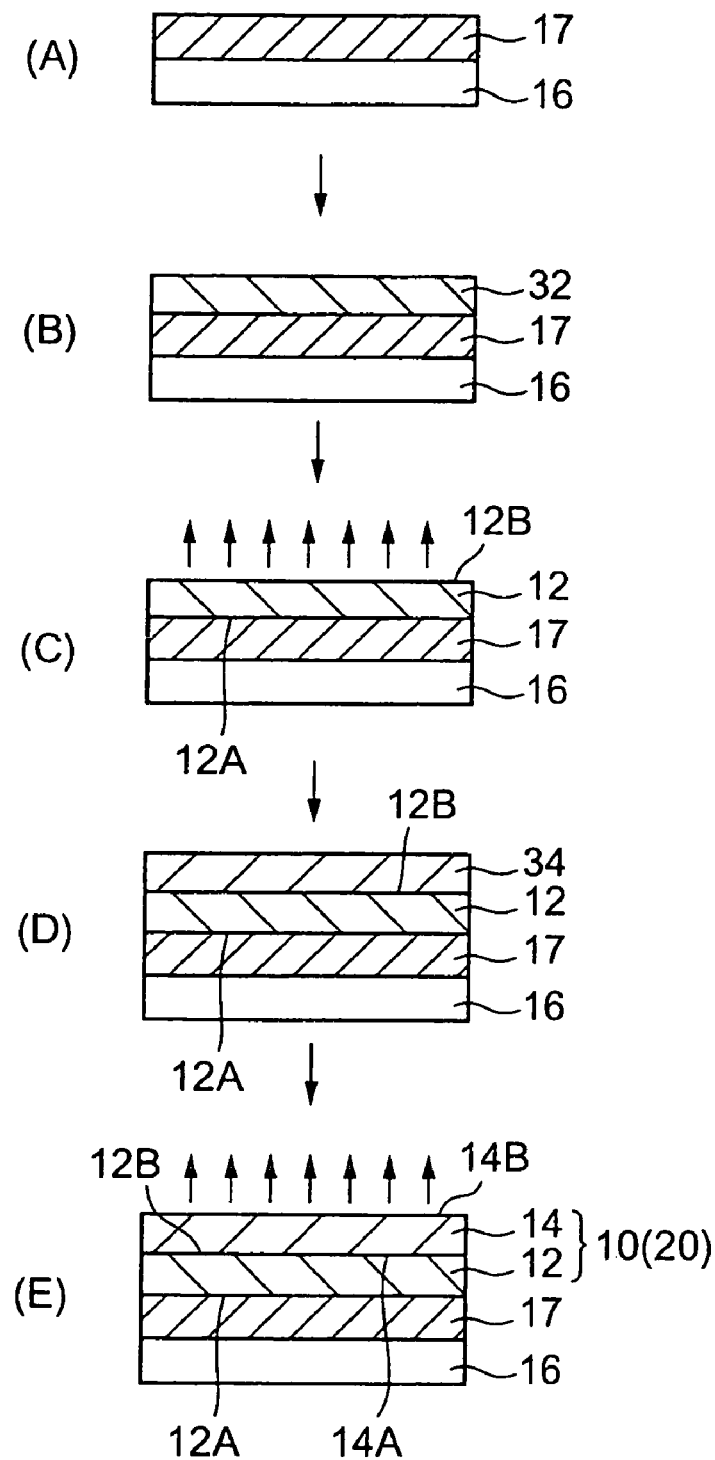
FIG. 6 is a diagrammatic cross-sectional view for explaining a second process of producing a retardation optical element according to an embodiment of the present invention.

In this case, an alignment layer 17 is formed in advance on a glass substrate or a polymeric film such as a TAC film 16, as shown in FIG. 6(A). A liquid crystalline polymer 32 that is cholesteric is applied to this alignment layer 17, as shown in FIG. 6(B), and is aligned by the alignment regulation power of the alignment layer 17. At this time, the liquid crystalline polymer 32 applied forms a liquid crystal layer.

A cholesteric liquid crystalline polymer in which a liquid crystalline polymer itself has chiral power may be used as it is as the liquid crystalline polymer 32. Alternatively, a mixture of a nematic liquid crystalline polymer and a cholesteric liquid crystalline polymer may be used as the liquid crystalline polymer 32. Specifically, for example, it is possible to use polymers containing mesogen groups, which make the polymers liquid crystalline, in their main or side chains, or in both their main and side chains; polymeric, cholesteric liquid crystals having cholesteryl groups in their side chains; such liquid crystalline polymers as are disclosed in Japanese Laid-Open Patent Publication No. 133810/1997; such liquid crystalline polymers as are disclosed in Japanese Laid-Open Patent Publication No. 293252/1999; and so forth.

The state of such a liquid crystalline polymer 32 changes with temperature. For example, a liquid crystalline polymer 32 having a glass transition temperature of 90° C. and an isotropic transition temperature of 200° C. is in the cholesteric liquid crystalline state at temperatures between 90° C. and 200° C.; by cooling to room temperature, it is possible to solidify this polymer into its glassy state while maintaining its structure cholesteric.

To adjust the wavelength of incident light that is selectively reflected owing to the cholesteric structure of the liquid crystalline polymer 32, it is proper to control the chiral power in the liquid crystalline molecules by a known method if a cholesteric liquid crystalline polymer is used as the liquid crystalline polymer 32. In the case where a mixture of a nematic liquid crystalline polymer and a cholesteric liquid crystalline polymer is used, it is, for this purpose, proper to adjust the mixing ratio of these two components.

In order to decrease the viscosity of the liquid crystalline polymer 32 for easy application, it may be dissolved, as needed, in a solvent such as toluene or MEK to give a coating liquid. In this case, it is necessary to effect the drying step of evaporating the solvent before the step of cooling the liquid crystalline polymer 32. Preferably, after effecting the step of applying the coating liquid, the drying step is effected to evaporate the solvent, and the step of aligning the liquid crystal layer is then effected.

With this state of alignment retained, that is, with the directions of the directors of liquid crystalline molecules on the surface, situated on the alignment layer 17 side, of the liquid crystalline polymer 32 being regulated, the liquid crystalline polymer 32 is cooled to a temperature below its glass transition temperature (Tg), as shown in FIG. 6(C), thereby solidifying the polymer into its glassy state. Thus, there is formed a C plate type retardation layer 12 that functions as a negative C plate such as is described above.

In the above process, if the alignment layer 17 is so formed that its entire surface exerts alignment regulation power in substantially one direction, it is possible to make the directions of the directors of liquid crystalline molecules on the surface 12A, in contact with the alignment layer 17, of the C plate type retardation layer 12 be substantially the same over the contact face.

In this case, in order to make the directions of the directors of liquid crystalline molecules on the surface 12B, situated on the side apart from the alignment layer 17, of the C plate type retardation layer 12 be substantially the same over the entire area of the surface 12B, it is proper to make the thickness of the C plate type retardation layer 12 uniform.

Alternatively, such a second alignment layer 17A as is shown in FIGS. 5(C) and 5(D) may also be provided on the surface, situated on the side apart from the alignment layer 17, of the liquid crystalline polymer 32. By doing so, it is possible to make, with higher certainty, the directions of the directors of liquid crystalline molecules on the surface 12B of the C plate type retardation layer 12 be substantially the same over the entire area of the surface 12B. It is proper to separate the second alignment layer 17A from the C plate type retardation layer 12 after the cooling step.

In this production process, the alignment layer 17 and/or second alignment layer 17A may be the same as those in the aforementioned first production process. In the case where a polymeric film such as a TAC film (organic material) is used as the substrate on which the alignment layer 17 is formed, it is preferable to previously provide, as in the above-described first production process, a barrier layer having resistance to solvents, such as a PVA (polyvinyl alcohol) layer, on the polymeric film, so that the substrate is not damaged by a solvent in which the liquid crystalline polymer 32 is dissolved to give a coating liquid; the coating liquid is then applied to this barrier layer.

(2) Formation of a Plate Type Retardation Layer

Thereafter, as shown in FIG. 6(D), separately-prepared another liquid crystalline polymer 34 that is nematic and develops a nematic liquid crystal phase at a predetermined temperature is applied directly to the C plate type retardation layer 12 that has been formed in the above-described manner, and is aligned by the alignment regulation power of the surface 12B of the C plate type retardation layer 12. At this time, the liquid crystalline polymer 34 applied forms a liquid crystal layer.

Such a nematic liquid crystalline polymer as is described in Japanese Laid-Open Patent Publication No. 293252/1999 mentioned previously, for example, is used as the liquid crystalline polymer 34.

The state of such a liquid crystalline polymer 34 changes with temperature. The liquid crystalline polymer 34 is in the nematic liquid crystalline state at temperatures in a predetermined temperature range; by cooling to room temperature, it is possible to solidify this liquid crystalline polymer 34 into its glassy state while maintaining its structure nematic.

In order to decrease the viscosity of the liquid crystalline polymer 34 for easy application, it may be dissolved, as needed, in a solvent such as toluene or MEK to give a coating liquid as in the case of the liquid crystalline polymer 32. In this case, it is necessary to effect the drying step of evaporating the solvent before the step of cooling the liquid crystalline polymer 34. Preferably, after effecting the step of applying the coating liquid, the drying step is effected to evaporate the solvent, followed by the step of aligning the liquid crystal.

Next, with this state of alignment retained, that is, with the directions of the directors of liquid crystalline molecules on the surface, situated on the C plate type retardation layer 12 side, of the liquid crystalline polymer 34 being regulated by the alignment regulation power of the surface of the C plate type retardation layer 12, the liquid crystalline polymer 34 is cooled to a temperature below its glass transition temperature (Tg), as shown in FIG. 6(E), thereby solidifying the polymer into its glassy state. Thus, there is formed an A plate type retardation layer 14 that functions as an A plate such as is described above.

In order to make the directions of the directors of liquid crystalline molecules on the surface 14B, situated on the side apart from the C plate type retardation layer 12, of the A plate type retardation layer 14 be substantially the same over the entire area of the surface 14B, it is proper to make the C plate type retardation layer 12 to have a uniform thickness, and, at the same time, the A plate type retardation layer 14 to have a uniform thickness. Alternatively, when solidifying the C plate type retardation layer 12 by cooling, such a second alignment layer 17A as is shown in FIGS. 5(A) to 5(D) may be used, and, in addition, when solidifying the A plate type retardation layer 14 by cooling, a second alignment layer that is the same as the second alignment layer 17A shown in FIGS. 5(C) and 5(D) may be provided on the surface, situated on the side apart from the surface 12B of the C plate type retardation layer 12, of the liquid crystalline polymer 34.

In producing the retardation optical element 20 shown in FIG. 2, it is necessary to make the directions of the directors Cb of liquid crystalline molecules on the surface 22B, on the side apart from the alignment layer 17, of the C plate type retardation layer 22 be the same as the directions of the directors Ca of liquid crystalline molecules on the surface 22A, situated on the alignment layer 17 side, of the C plate type retardation layer 22, and to make the directions of the directors Nb of liquid crystalline molecules on the surface 14B, situated on the side apart from the C plate type retardation layer 22, of the A plate type retardation layer 14 be the same as the directions of the directors Ca of liquid crystalline molecules on the surface 22A, situated on the side apart from the A plate type retardation layer 14, of the C plate type retardation layer 22. To fulfill the above requirements, the coating thickness of a liquid crystal may be adjusted so that the thickness of the C plate type retardation layer 22 and that of the A plate type retardation layer 14 are equal to (0.5×integer) times the helical pitch in the helical structure consisting of liquid crystalline molecules. Alternatively, such a second alignment layer 17A as is shown in FIGS. 5(C) and 5(D) may be used. When used, the second alignment layer 17A is brought into contact with the surface 22B, situated on the side opposite to the alignment layer 17, of the C plate type retardation layer 22, or with the surface 14B, situated on the side opposite to the C plate type retardation layer 22, of the A plate type retardation layer 14.

Thus, there is produced a retardation optical element 10 (20) in which the C plate type retardation layer 12 (22) and the A plate type retardation layer 14 are laminated adjacently to each other.

In all of the above-described embodiments, the C plate type retardation layer 12 (22) having a cholesteric structure is firstly formed on the alignment layer 17 that has been formed on a glass substrate or a polymeric film such as a TAC film 16, and the A plate type retardation layer 14 having a nematic structure is then formed on this C plate type retardation layer 12 (22). The present invention is not limited to this, and the retardation optical element may also be produced by firstly forming the A plate type retardation layer 14 having a nematic structure, and then forming, on this A plate type retardation layer 14, the C plate type retardation layer 12 (22) having a cholesteric structure. In this case, a cholesteric liquid crystal is applied directly to the A plate type retardation layer 14 and is then solidified with the directions of the directors of liquid crystalline molecules on the surface, situated on the A plate type retardation layer 14 side, of the liquid crystal being regulated by the alignment regulation power of the surface of the A plate type retardation layer 14, thereby forming the C plate type retardation layer 12 (22). The other procedures, conditions, and so forth in this production process are basically the same as those in the above-described production process, so that detailed explanations for them are omitted.

Further, in all of the above-described embodiments, the retardation optical element has a two-layered structure composed of the single, C plate type retardation layer 12 (22) and the single, A plate type retardation layer 14. The present invention is not limited to this, and the retardation optical element can have a structure consisting of three or more layers in which at least one of the above-described C plate type retardation layer and A plate type retardation layer is made from two or more layers. If so made, the retardation optical element can provide more diversified types of optical compensation.

Figure 7:
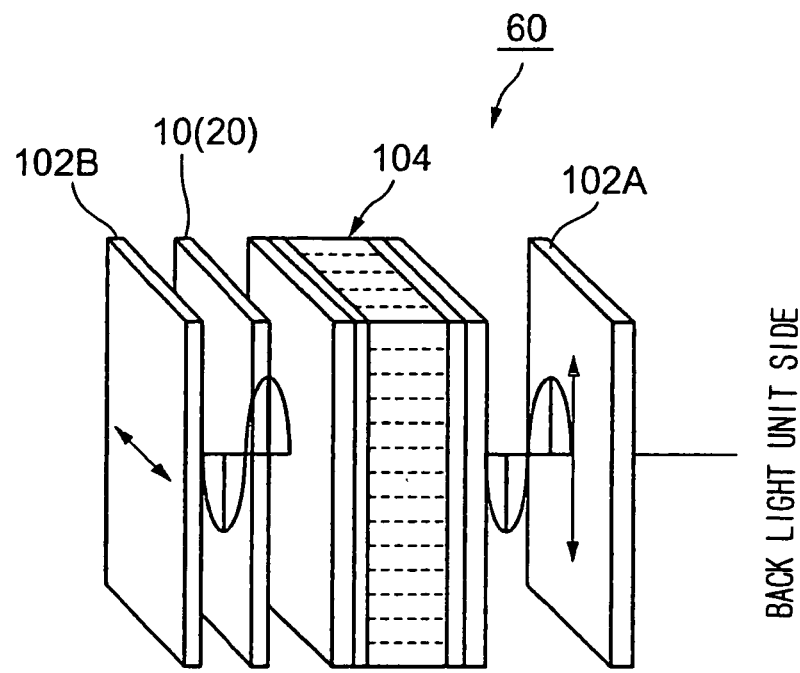
FIG. 7 is a diagrammatic, exploded perspective view showing a liquid crystal display comprising a retardation optical element according to an embodiment of the present invention.

The retardation optical elements 10 and 20 according to the aforementioned embodiments can be incorporated into such a liquid crystal display 60 as is shown in FIG. 7, for example.

The liquid crystal display 60 shown in FIG. 7 comprises a polarizer 102A on the incident side, a polarizer 102B on the emergent side, and a liquid crystal cell 104.

Of these components, the polarizers 102A and 102B are so made that they selectively transmit only linearly polarized light having the plane of vibration in a predetermined direction, and are arranged in the cross nicol disposition so that the direction of vibration of the linearly polarized light transmitted by the polarizer 102A is perpendicular to that of vibration of the linearly polarized light transmitted by the polarizer 102B. The liquid crystal cell 104 contains a large number of cells corresponding to pixels and is placed between the polarizers 102A and 102B.

In the liquid crystal display 60, the liquid crystal cell 104 is of VA mode, in which a nematic liquid crystal having negative dielectric anisotropy is sealed in a liquid crystal cell. Linearly polarized light that has passed through the polarizer 102A on the incident side passes, without undergoing phase shift, through those cells in the liquid crystal cell 104 that are in the non-driven state, and is blocked by the polarizer 102 on the emergent side. On the contrary, when the linearly polarized light passes through those cells in the liquid crystal cell 104 that are in the driven state, it undergoes phase shift, and this phase-shifted light passes through and emerges from the polarizer 102B on the emergent side in an amount corresponding to the amount of the phase shift. It is therefore possible to display the desired image on the emergent-side polarizer 102B side by properly, individually controlling the driving voltage that is applied to each cell in the liquid crystal cell 104.

In the liquid crystal display 60 of the above-described construction, the retardation optical element 10 (20) according to the aforementioned embodiment is placed between the liquid crystal cell 104 and the polarizer 102B on the emergent side (a polarizer capable of selectively transmitting light in a predetermined state of polarization, emerging from the liquid crystal cell 104). Of the light in a predetermined state of polarization, emerging from the liquid crystal cell 104, the light emerging slantingly in the direction deviating from the normal to the liquid crystal cell 104 can be optically compensated by the retardation optical element 10 (20) for the state of polarization.

It is herein preferable to place the retardation optical element 10 (20) so that the C plate type retardation layer 12 (22) faces to the liquid crystal cell 104 and that the A plate type retardation layer 14 faces to the polarizer 102B. By so placing the retardation optical element 10 (20), it is possible to effectively obtain the desired performances.

As mentioned above, according to the liquid crystal display 60 of the above-described construction, the retardation optical element 10 (20) according to the aforementioned embodiment is placed between the liquid crystal cell 104 and the polarizer 102B on the emergent side, whereby, of the light emerging from the liquid crystal cell 104, the light emerging slantingly in the direction deviating from the normal to the liquid crystal cell 104 is optically compensated by the retardation optical element for the state of polarization. The retardation optical element can, therefore, prevent the appearance of bright-and-dark patterns on the liquid crystal display 60 and, moreover, improve contrast, while effectively improving viewing angle dependency; lowering of display quality can thus be prevented.

The liquid crystal display 60 shown in FIG. 7 is of transmission type, which light is transmitted from one side to the other in the direction of thickness. This embodiment is not limited to this type of display, and the retardation optical element 10 (20) according to the above-described embodiment may be incorporated also into a liquid crystal display of reflection type or of reflection/transmission type.

Further, in the liquid crystal display 60 shown in FIG. 7, the retardation optical element 10 (20) according to the above-described embodiment is placed between the liquid crystal cell 104 and the polarizer 102B on the emergent side. However, depending on the type of optical compensation desired, the retardation optical element 10 (20) may be placed between the liquid crystal cell 104 and the polarizer 102A on the incident side. Furthermore, the retardation optical element 10 (20) may be placed on both sides of the liquid crystal cell 104 (between the liquid crystal cell 104 and the polarizer 102A on the incident side, and between the liquid crystal cell 104 and the polarizer 102B on the emergent side). It is noted that not only one but also a plurality of retardation optical elements may be placed between the liquid crystal cell 104 and the polarizer 102A on the incident side, or between the liquid crystal cell 104 and the polarizer 102B on the emergent side. In all of these cases, it is preferable to place the retardation optical element 10 (20) so that the C plate type retardation layer 12 faces to the liquid crystal cell 104 and that the A plate type retardation layer 14 faces to the polarizer 102A or 102B.

EXAMPLES

Examples of the aforementioned embodiments will now be given together with Comparative Examples.

Example 1

In Example 1, a retardation layer functioning as a negative C plate and a retardation layer functioning as an A plate were made uniform in thickness, whereby the directions of the directors of liquid crystalline molecules on the surfaces of each retardation layer were made the same.

A solution (chiral nematic liquid crystal solution) was prepared by dissolving, in toluene, 90 parts of a monomer containing, in its molecule, polymerizable acrylates at both ends and spacers between mesogen existing at the center and the acrylates, having a nematic-isotropic transition temperature of 110° C. (i.e., a monomer having a molecular structure represented by the above chemical formula (11)) and 10 parts of a chiral agent having, in its molecule, polymerizable acrylates at both ends (i.e., a compound having a molecular structure represented by the above chemical formula (14)). To this toluene solution, a photopolymerization initiator ("Irgacure® 907" available from Chiba Specialty Chemicals K.K., Japan) was added in an amount of 5% by weight of the above-described monomer. (With respect to the chiral nematic liquid crystal thus obtained, it was confirmed that the directors of liquid crystalline molecules were oriented at the surface of the alignment layer in the direction within the direction of rubbing ±5 degrees.)

On the other hand, a transparent glass substrate was spin-coated with polyimide ("Optomer® AL1254" manufactured by JSR Corporation, Japan) dissolved in a solvent. After drying, a film of the polyimide was formed at 200° C. (film thickness 0.1 µm) and was rubbed in one direction in order to make the film function as an alignment layer.

The glass substrate coated with the alignment layer was set in a spin-coater and was spin-coated with the toluene solution of the above-described monomer, etc. under such conditions that the resulting film had a thickness as uniform as possible.

The toluene contained in the above toluene solution was then evaporated at 80° C. to form a coating film. A glass substrate with an alignment layer (second alignment layer) prepared separately was placed on the surface of the coating film on the side opposite to the above-described glass substrate with respect to the alignment layer (first alignment layer), thereby sandwiching the coating film. In this process, the first and second alignment layers were made the same in terms of the direction of rubbing.

Ultraviolet light was applied to the above coating film, and with radicals thus released from the photopolymerization initiator contained in the coating film, the acrylates in the monomer molecules were three-dimensionally cross-linked for solidification (polymerization), thereby forming a layer having a cholesteric structure. At this time, the separately prepared glass substrate with the alignment layer (second alignment layer) described above was separated from the coating film. The thickness of the coating film was 2.0 µm±1.5% at this point. By the measurement made by using a spectrophotometer, it was found that the central wavelength of the selective reflection wave range of the coating film was 280 nm.

The above layer having a cholesteric structure formed in this manner was subjected to measurements using an automatic birefringence measuring instrument (trade name "KOBRA® 21ADH" manufactured by Oji Keisoku Kiki Kabushiki Kaisha, Japan). As a result, it was confirmed that this layer was functioning as a negative C plate (retardation layer).

Next, the above layer having a cholesteric structure was spin-coated with a toluene solution (nematic liquid crystal solution) containing the same components as those in the above-described toluene solution, provided that the chiral agent was not contained, under such conditions that the resulting film had a thickness as uniform as possible.

The toluene contained in the above toluene solution was then evaporated at 80° C. to form a coating film. Ultraviolet light was applied to this coating film, and with radicals thus released from the photopolymerization initiator contained in the coating film, the acrylates in the monomer molecules were three-dimensionally cross-linked for solidification (polymerization), thereby forming a layer having a nematic structure.

Thus, there was finally produced a retardation optical element in which the layer having a cholesteric structure and the layer having a nematic structure were laminated adjacently to each other. The total thickness of this retardation optical element was 3.5 µm±1.5%.

The retardation optical element produced in this manner was subjected to measurements using an automatic birefringence measuring instrument (trade name "KOBRA® 21ADH" manufactured by Oji Keisoku Kiki Kabushiki Kaisha, Japan). As a result, it was confirmed that this retardation optical element was functioning as both a negative C plate and an A plate.

Further, the cross section of the layer having a cholesteric structure (the retardation layer functioning as a negative C plate) and that of the layer having a nematic structure (the retardation layer functioning as an A plate) were observed using a transmission electron microscope. As a result, the bright-and-dark patterns that appeared in the retardation layer functioning as a negative C plate were found to be parallel to each other (from this, it is understood that the helical axes in the retardation layer functioning as a negative C plate extend in the same direction). On the other hand, no bright-and-dark patterns appeared in the retardation layer functioning as an A plate (from this, it is understood that the directions of the directors of liquid crystalline molecules in the retardation layer functioning as an A plate are the same). Moreover, the contrasts on the two main opposite surfaces of the retardation layer functioning as an A plate were the same, and the contrasts on the two main opposite surfaces of the retardation layer functioning as a negative C plate were also the same (from this, it is understood that the directions of the directors of liquid crystalline molecules on the two main opposite surfaces of the retardation layer functioning as an A plate are the same, and that the directions of the directors of liquid crystalline molecules on the two main opposite surfaces of the retardation layer functioning as a negative C plate are also the same).

Figure 8:
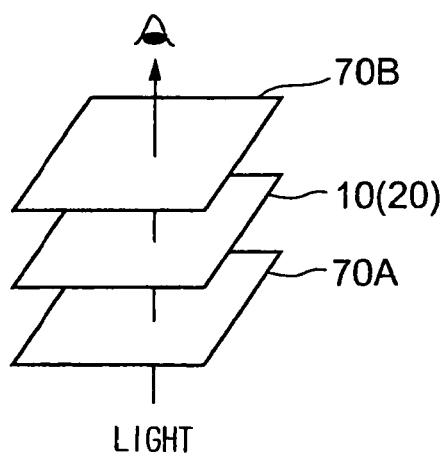
FIG. 8 is a diagrammatic, exploded perspective view showing a disposition of a retardation optical element and polarizers at the time when the retardation optical element sandwiched between the polarizers is observed.
Figure 9:
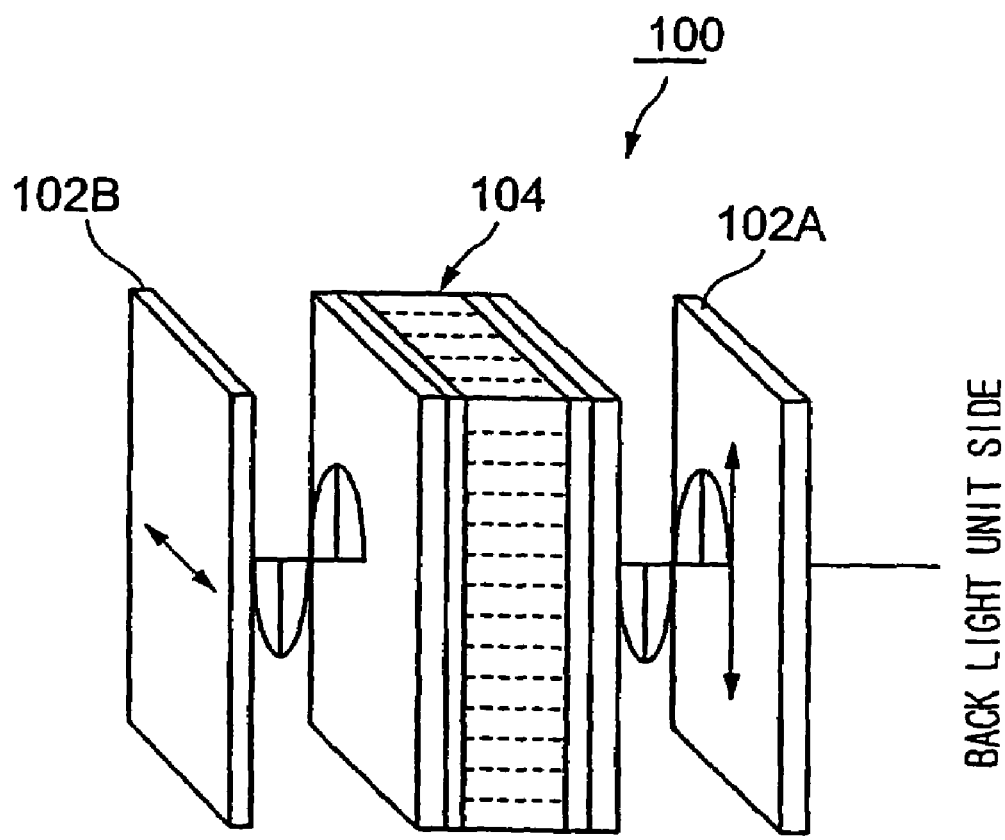
FIG. 9 is a diagrammatic, exploded perspective view showing a conventional liquid crystal display.

Furthermore, the retardation optical element 10 produced was placed between linear polarizers 70A and 70B arranged in the cross nicol disposition, as shown in FIG. 8, and was visually observed. As a result, the bright-and-dark patterns observed on the plane were very few.

Comparative Example 1

In Comparative Example 1, the procedure of Example 1 was repeated, provided that the thickness of the retardation layer functioning as a negative C plate was made non-uniform in order to make the directions of the directors of liquid crystalline molecules be different from one another.

Namely, a retardation optical element was produced in the same manner as in Example 1, except that the thickness of the layer having a cholesteric structure (the retardation layer functioning as a negative C plate) was made 2.0 μm±5% by changing the settings for the spin coater and that the second alignment layer was not used. This retardation optical element was observed in the same way as in Example 1. As a result, bright-and-dark patterns were clearly observed on the plane.

Comparative Example 2

In Comparative Example 2, the procedure of Example 1 was repeated, provided that the alignment layer on which the retardation layer functioning as a negative C plate would be formed was obtained by rubbing the coating film in various directions in order to make the directions of the directors of liquid crystalline molecules be different from one another.

Namely, a retardation optical element was produced in the same manner as in Example 1, except that the alignment layer was obtained by rubbing the coating film in different directions. This retardation optical element was observed in the same way as in Example 1. As a result, bright-and-dark patterns were clearly observed on the plane.

Example 2

In Example 2, a retardation layer functioning as a negative C plate was made uniform in thickness, and the helical pitches were made equal, whereby the directions of the directors of liquid crystalline molecules on the two main opposite surfaces of this layer were made parallel to each other.

Namely, a retardation optical element was produced in the same manner as in Example 1, except that considering the refractive index of the material to be used, the retardation layer functioning as a negative C plate was made to have such a thickness that the directions of the directors at the starting point and end of the cholesteric structure were parallel to each other. This retardation optical element was observed in the same way as in Example 1. As a result, the bright-and-dark patterns that appeared on the plane were found obviously fewer than those patterns that appeared when the retardation optical element containing the retardation layer whose thickness was different from the above-described thickness was observed.

The retardation optical element 20 produced was, as shown in FIG. 8, placed between linear polarizers 70A and 70B arranged in the cross nicol disposition and was visually observed. As a result, the bright-and-dark patterns observed on the plane were extremely few. Further, the linear polarizers 70A and 70B (see FIG. 8) placed on both sides of the retardation optical element 20 produced were individually rotated, and the angle made by the direction of the director at the starting point of the cholesteric structure and that of the director at the end of this structure was visually determined by the intensity of transmitted light. As a result, this angle was found to be within ±5 degrees.

Comparative Example 3

In Comparative Example 3, the procedure of Example 2 was repeated, provided that the thickness of the retardation layer functioning as a negative C plate was made non-uniform in order to make the directions of the directors of liquid crystalline molecules different from one another.

Namely, a retardation optical element was produced in the same manner as in Example 2, except that the thickness of the layer having a cholesteric structure (the retardation layer functioning as a negative C plate) was made 2.0 μm±5% by changing the settings for the spin coater and that the second alignment layer was not used. This retardation optical element was observed in the same way as in Example 2. As a result, bright-and-dark patterns were clearly observed on the plane.

Example 3

In Example 3, liquid crystalline polymers were used as materials for a retardation layer functioning as a negative C plate and for a retardation layer functioning as an A plate, and these retardation layers were made uniform in thickness, whereby the directions of the directors of liquid crystalline molecules on the surfaces of each retardation layer were made the same.

A solution (polymeric, cholesteric liquid crystal solution) was prepared by dissolving, in toluene, a side-chain acrylic liquid crystalline polymer having a glass transition temperature of 80° C. and an isotropic transition temperature of 200° C. (With respect to the polymeric, cholesteric liquid crystal thus obtained, it was confirmed that the directors of liquid crystalline molecules were oriented at the surface of the alignment layer in the direction within the direction of rubbing ±5 degrees.)

On the other hand, a transparent glass substrate was spin-coated with polyimide ("Optomer® AL1254" manufactured by JSR Corporation, Japan) dissolved in a solvent. After drying, a film of the polyimide was formed at 200° C. (film thickness 0.1 μm) and was rubbed in one direction in order to make this film function as an alignment layer.

The glass substrate coated with the alignment layer was set in a spin-coater and was spin-coated with the toluene solution of the above-described liquid crystalline polymer under such conditions that the resulting film had a thickness as uniform as possible.

The toluene contained in the above toluene solution was then evaporated at 90° C. to form a coating film. A glass substrate with an alignment layer (second alignment layer) prepared separately was placed on the surface of the coating film on the side opposite to the above-described glass substrate with respect to alignment layer (first alignment layer), thereby sandwiching the coating film. In this process, the first and second alignment layers were made the same in terms of the direction of rubbing.

The above coating film was held at 150° C. for 10 minutes, and it was visually confirmed by means of selective reflection that the coating film was cholesteric. This coating film was then cooled to room temperature for solidifying the liquid crystalline polymer into its glassy state, thereby forming a layer having a cholesteric structure. At this time, the separately prepared glass substrate with the alignment layer (second alignment layer) described above was separated from the coating film. The thickness of the coating film was 2.0 μm±1.5% at this point. By the measurement made by using a spectrophotometer, it was found that the central wavelength of the selective reflection wave range of the coating film was 280 nm.

The above layer having a cholesteric structure formed in this manner was subjected to measurements using an automatic birefringence measuring instrument (trade name "KOBRA® 21ADH" manufactured by Oji Keisoku Kiki Kabushiki Kaisha, Japan). As a result, it was confirmed that this layer was functioning as a negative C plate (retardation layer).

Next, the above layer having a cholesteric structure was spin-coated with a toluene solution containing a nematic liquid crystalline polymer (polymeric, nematic liquid crystal solution) under such conditions that the resulting film had a thickness as uniform as possible.

The toluene contained in the above toluene solution was then evaporated at 90° C. to form a coating film. This coating film was cooled to room temperature for solidifying the liquid crystalline polymer into its glassy state, thereby forming a layer having a nematic structure.

Thus, there was finally produced a retardation optical element in which the layer having a cholesteric structure and the layer having a nematic structure were laminated adjacently to each other. The total thickness of this retardation optical element was 3.5 μm±1.5%.

The retardation optical element produced in this manner was subjected to measurements using an automatic birefringence measuring instrument (trade name "KOBRA® 21ADH" manufactured by Oji Keisoku Kiki Kabushiki Kaisha, Japan). As a result, it was confirmed that this retardation optical element was functioning as both a negative C plate and an A plate.

Further, the cross section of the layer having a cholesteric structure (the retardation layer functioning as a negative C plate) and that of the layer having a nematic structure (the retardation layer functioning as an A plate) were observed using a transmission electron microscope. As a result, the bright-and-dark patterns that appeared in the retardation layer functioning as a negative C plate were found to be parallel to each other (from this, it is understood that the helical axes in the retardation layer functioning as a negative C plate extend in the same direction). On the other hand, no bright-and-dark patterns appeared in the retardation layer functioning as an A plate (from this, it is understood that the directions of the directors of liquid crystalline molecules in the retardation layer functioning as an A plate are the same). Moreover, the contrasts on the two main opposite surfaces of the retardation layer functioning as an A plate were the same, and the contrasts on the two main opposite surfaces of the retardation layer functioning as a negative C plate were also the same (from this, it is understood that the directions of the directors of liquid crystalline molecules on the two main opposite surfaces of the retardation layer functioning as an A plate are the same and that the directions of the directors of liquid crystalline molecules on the two main opposite surfaces of the retardation layer functioning as a negative C plate are also the same).

Furthermore, the retardation optical element 10 produced was placed between linear polarizers 70A and 70B arranged in the cross nicol disposition, as shown in FIG. 8, and was visually observed. As a result, the bright-and-dark patterns observed on the plane were very few.

Comparative Example 4

In Comparative Example 4, the procedure of Example 3 was repeated, provided that the thickness of the retardation layer functioning as a negative C plate was made non-uniform in order to make the direction of the directors of liquid crystalline molecules be different from one another.

Namely, a retardation optical element was produced in the same manner as in Example 3, except that the thickness of the layer having a cholesteric structure (the retardation layer functioning as a negative C plate) was made 2.0 μm±5% by changing the settings for the spin coater and that the second alignment layer was not used. This retardation optical element was observed in the same way as in Example 3. As a result, bright-and-dark patterns were clearly observed on the plane.

The invention claimed is:

1. A retardation optical element, comprising:
    a transmission type C plate type retardation layer; and
    a transmission type A plate type retardation layer laminated together with the C plate type retardation layer so that a first surface of the A plate type retardation layer contacts a first surface of the C plate type retardation layer;
    wherein:
    the C plate retardation layer has a cholesteric structure including liquid crystalline molecules in planar orientation, a helical pitch of the liquid crystalline molecules being configured such that the C plate type retardation layer selectively reflects light having a wavelength in a wave range that is different from a wave range of incident light;
    the C plate type retardation layer functions as a negative C plate;
    the A plate type retardation layer has a nematic structure;
    the A plate type retardation layer functions as an A plate;
    directors of liquid crystalline molecules on the first surface of the C plate type retardation layer and directors of liquid crystalline molecules on the first surface of the A plate type retardation layer are arranged in substantially the same direction.

2. The retardation optical element according to claim 1, wherein the directors of liquid crystalline molecules on the first surface of the C plate type retardation layer and directors of liquid crystalline molecules on a second surface of the C plate type retardation layer are substantially parallel.

3. The retardation optical element according to claim 1, wherein the directors of liquid crystalline molecules on a second surface of the C plate type retardation layer and directors of liquid crystalline molecules on a second surface of the A plate type retardation layer are substantially parallel.

4. The retardation optical element according to claim 1, wherein the helical pitch of the liquid crystalline molecules of the C plate type retardation layer has a pitch number substantially equal to (0.5×integer) between the first surface and a second surface opposite from the first surface.

5. The retardation optical element according to claim 1, wherein the C plate type retardation layer comprises chiral nematic liquid crystal solidified by three-dimensional cross-linking.

6. The retardation optical element according to claim 1, wherein the C plate type retardation layer comprises polymeric, cholesteric liquid crystal solidified into a glassy state.

7. The retardation optical element according to claim 1, wherein the A plate type retardation layer comprises nematic liquid crystal solidified by three-dimensional cross-linking.

8. The retardation optical element according to claim 1, wherein the A plate type retardation layer comprises polymeric, nematic liquid crystal solidified into a glassy state.

9. A liquid crystal display comprising:
a liquid crystal cell;
a first polarizer provided on a first side of the liquid crystal cell;
a second polarizer provided on a second side of the liquid crystal cell; and
the retardation optical element according to claim 1;
wherein:
the retardation optical element is located between the liquid crystal cell and one of the polarizers; and
the retardation optical element compensates for predetermined state of polarization of light, incident on and/or emerging from the liquid crystal cell, emerging slantingly in a direction deviating from normal to the liquid crystal cell.

10. A process of producing a retardation optical element, comprising:
applying a first liquid crystal having cholesteric regularity to an alignment surface of an alignment layer having alignment regulation power in substantially one direction over the entire alignment surface;
solidifying the first liquid crystal to form a transmission type C plate type retardation layer that functions as a negative C plate, wherein, when the first liquid crystal is solidified, directions of directors of liquid crystalline molecules on a first surface of the C plate type retardation layer are regulated by the alignment regulation power of the alignment layer, and the C plate type retardation layer selectively reflects light having a wavelength in a wave range different from a wave range of incident light;
applying a second liquid crystal having a nematic regularity directly to the C plate type retardation layer; and
solidifying the second liquid crystal to form a transmission type A plate type retardation layer that functions as an A plate, wherein, when the second liquid crystal is solidified, directions of directors of liquid crystalline molecules on a first surface of the A plate type retardation layer adjacent to the C plate type retardation layer are regulated by an alignment regulation power of a second surface of the C plate type retardation layer.

11. The process according to claim 10, wherein:
the first liquid crystal comprises at least one of polymerizable cholesteric monomers and oligomers, the first liquid crystal being solidified by three-dimensional cross-linking; and
the second liquid crystal comprises at least one of polymerizable nematic monomers and oligomers, the second liquid crystal being solidified by three-dimensional cross-linking.

12. The process according to claim 10, wherein:
the first liquid crystal comprises a cholesteric liquid crystalline polymer, the first liquid crystal being solidified into a glassy state by cooling; and
the second liquid crystal comprises a nematic liquid crystalline polymer, the second liquid crystal being solidified into a glassy state by cooling.

13. The process according to claim 10, wherein applying the first liquid crystal comprises applying the first liquid crystal in a coating thickness selected so directors of liquid crystalline molecules on the first surface of the C plate type retardation layer and directors of liquid crystalline molecules on the second surface of the C plate type retardation layer are substantially parallel.

14. The process according to claim 10, further comprising bringing a second alignment layer into contact with a surface of the applied first liquid crystal opposite from a surface in contact with the alignment layer before solidifying the first liquid crystal so that, when the first liquid crystal is solidified, directions of directors of liquid crystalline molecules on the first and second surfaces of the C plate type retardation layer are regulated.

15. The process according to claim 10, further comprising bringing a second alignment layer into contact with a surface of the applied second liquid crystal opposite from a surface in contact with the C plate type retardation layer before solidifying the second liquid crystal so that, when the second liquid crystal is solidified, directions of directors of liquid crystalline molecules on the first surface of the A plate type retardation layer and a second surface of the A plate type retardation layer are regulated.

16. A process of producing a retardation optical element, comprising:
applying a first liquid crystal having nematic regularity to an alignment surface of an alignment layer having alignment regulation power in substantially one direction over the entire alignment surface;
solidifying the first liquid crystal to form a transmission type A plate type retardation layer that functions as an A plate, wherein, when the first liquid crystal is solidified, directions of directors of liquid crystalline molecules on a first surface of the A plate type retardation layer are regulated by the alignment regulation power of the alignment layer;
applying a second liquid crystal having a cholesteric regularity directly to the A plate type retardation layer; and
solidifying the second liquid crystal to form a transmission type C plate type retardation layer that functions as a negative C plate, wherein, when the second liquid crystal is solidified, directions of directors of liquid crystalline molecules on a first surface of the C plate type retardation layer adjacent to the A plate type retardation layer are regulated by an alignment regulation power of a second surface of the A plate type retardation layer, and the C plate type retardation layer selectively reflects light having a wavelength in a wave range different from a wave range of incident light.

17. The process according to claim 16, wherein:
the first liquid crystal comprises at least one of polymerizable nematic monomers and oligomers the first liquid crystal being solidified by three-dimensional cross-linking; and
the second liquid crystal comprises at least one of polymerizable cholesteric monomers and oligomers, the second liquid crystal being solidified by three-dimensional cross-linking.

18. The process according to claim 16, wherein:
the first liquid crystal comprises a nematic liquid crystalline polymer, the first liquid crystal being solidified into a glassy state by cooling; and
the second liquid crystal comprises a cholesteric liquid crystalline polymer, the second liquid crystal being solidified into a glassy state by cooling.

19. The process according to claim 16, wherein applying second liquid crystal comprises applying the second liquid crystal in a coating thickness selected so that directors of liquid crystalline molecules on the first surface of the C plate type retardation layer and directors of liquid crystalline molecules on a second surface of the C plate type retardation layer are substantially parallel.

20. The process according to claim 16, further comprising bringing a second alignment layer into contact with a surface of the applied second liquid crystal opposite from the A plate type retardation layer before solidifying the second liquid crystal so that, when the second liquid crystal is solidified, directions of directors of liquid crystalline molecules on first surface of the C plate type retardation layer and a second surface of the C plate type retardation layer are regulated.

21. The process according to claim 16, further comprising bringing a second alignment layer into contact with a surface of the applied first liquid crystal opposite from a surface in contact with the alignment layer before solidifying the first liquid crystal so that, when the first liquid crystal is solidified, directions of directors of liquid crystalline molecules on the first and second surfaces of the A plate type retardation layer are regulated.

* * * * *